United States Patent
Uematsu et al.

(10) Patent No.: US 12,143,168 B2
(45) Date of Patent: Nov. 12, 2024

(54) SIGNAL TRANSMISSION DEVICE, SIGNAL TRANSMISSION SYSTEM, AND INFORMATION PROVISION METHOD

(71) Applicant: HITACHI ASTEMO, LTD., Hitachinaka (JP)

(72) Inventors: Yutaka Uematsu, Tokyo (JP); Akihiro Okawa, Hitachinaka (JP); Masashi Saito, Hitachinaka (JP); Masayoshi Takahashi, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 4 days.

(21) Appl. No.: 18/250,615

(22) PCT Filed: Sep. 30, 2021

(86) PCT No.: PCT/JP2021/036349
§ 371 (c)(1),
(2) Date: Apr. 26, 2023

(87) PCT Pub. No.: WO2022/097395
PCT Pub. Date: May 12, 2022

(65) Prior Publication Data
US 2023/0412209 A1 Dec. 21, 2023

(30) Foreign Application Priority Data
Nov. 6, 2020 (JP) .................... 2020-186178

(51) Int. Cl.
*H04B 3/54* (2006.01)
*G07C 5/08* (2006.01)
*H04B 3/46* (2015.01)

(52) U.S. Cl.
CPC ............. *H04B 3/54* (2013.01); *G07C 5/0808* (2013.01); *G07C 5/0816* (2013.01); *H04B 3/46* (2013.01)

(58) Field of Classification Search
CPC . H04B 3/54; H04B 3/46; H04B 3/548; H04B 3/56; H04B 3/48; H04B 17/10;
(Continued)

(56) References Cited

U.S. PATENT DOCUMENTS

| 4,006,942 A | * | 2/1977 | Saito | ........................ B60T 8/172 |
| | | | | 303/DIG. 5 |
| 5,065,404 A | * | 11/1991 | Okajima | ............... H01S 5/2231 |
| | | | | 372/45.01 |

(Continued)

FOREIGN PATENT DOCUMENTS

JP 2016-100900 A 5/2016

OTHER PUBLICATIONS

International Search Report with English Translation and Written Opinion dated Dec. 14, 2021 in corresponding International Application No. PCT/JP2021/036349.

*Primary Examiner* — James M Perez
(74) *Attorney, Agent, or Firm* — Foley & Lardner LLP

(57) ABSTRACT

A signal transmission device includes a communication unit that performs communication using differential transmission with an electronic device via a differential wiring, and a signal processing unit that performs signal processing related to the communication, in which the communication unit is capable of receiving, via the differential wiring, communication signals transmitted from the electronic device at each of a plurality of signal transmission rates including at least a first signal transmission rate and a second signal transmission rate lower than the first signal transmission rate, the communication unit measures an amplitude of the communication signals received from the electronic (Continued)

device at the second signal transmission rate, and the signal processing unit detects a short-circuit failure of a filter circuit on the basis of the amplitude measured by the communication unit.

17 Claims, 13 Drawing Sheets

(58) Field of Classification Search
CPC ........ H04B 17/15; H04B 17/16; H04B 17/17; H04B 17/18; G07C 5/0808; G07C 5/0816; H04L 25/02; H04L 25/10; H04L 25/12; H04L 25/0262
See application file for complete search history.

(56) References Cited

U.S. PATENT DOCUMENTS

| | | | | |
|---|---|---|---|---|
| 6,688,279 B2* | 2/2004 | Ishikawa | ............... | F02D 41/024 123/456 |
| 7,263,174 B2* | 8/2007 | Schmidt | ............... | H04M 3/306 379/1.04 |
| 8,761,350 B2* | 6/2014 | Faulkner | ............. | H04L 41/0677 379/1.04 |
| 8,948,596 B2* | 2/2015 | Nielsen | ............. | H04B 10/2575 398/115 |
| 9,347,311 B2* | 5/2016 | Xiao | ........ | E21B 43/128 |
| 9,385,780 B2* | 7/2016 | Alloin | ............... | H04L 27/2688 |
| 9,654,173 B2* | 5/2017 | Barzegar | ............... | H04B 3/52 |
| 9,705,571 B2* | 7/2017 | Gerszberg | ............... | H04L 5/003 |
| 9,859,951 B2* | 1/2018 | Heath | ................ | H04L 12/10 |
| 10,097,240 B2* | 10/2018 | Hansell | ................... | H04B 3/546 |
| 10,122,413 B2* | 11/2018 | Heath | ................... | H02J 3/12 |
| 10,256,867 B2* | 4/2019 | Heath | ............... | H04L 12/40045 |
| 10,541,724 B2* | 1/2020 | Martin | .................. | H04B 3/542 |
| 10,554,257 B2* | 2/2020 | Hansell | ................. | H04L 41/083 |
| 10,594,519 B2* | 3/2020 | Bhagwat | ............. | H04L 25/0276 |
| 10,910,813 B2* | 2/2021 | Oda | ........................ | G05B 15/02 |
| 11,162,443 B2* | 11/2021 | Mizushima | ............. | F02D 41/0007 |
| 11,268,508 B2* | 3/2022 | Miyazawa | ............... | F04C 14/12 |
| 11,292,308 B2* | 4/2022 | Nasu | ...................... | B60W 40/11 |
| 11,365,699 B2* | 6/2022 | Suzuki | ................... | F02D 41/222 |
| 11,390,320 B2* | 7/2022 | Ueno | .................. | B62D 5/0421 |
| 11,448,174 B2* | 9/2022 | Kato | ..................... | F02D 41/20 |
| 11,466,747 B2* | 10/2022 | Nakano | ................... | F16F 9/185 |
| 11,467,015 B2* | 10/2022 | Isoya | ....................... | G01F 1/68 |
| 11,546,503 B1* | 1/2023 | Kundu | ..................... | H04N 7/181 |
| 11,603,080 B2* | 3/2023 | Yokoyama | ............. | B60T 13/58 |
| 11,603,900 B2* | 3/2023 | Nakano | ................. | F16F 9/3485 |
| 11,618,424 B2* | 4/2023 | Nakagawa | ............ | B60T 13/686 303/10 |
| 11,676,403 B2* | 6/2023 | Kundu | ................... | H04N 23/76 382/104 |
| 11,682,997 B2* | 6/2023 | Su | ........................... | H02P 27/08 318/490 |
| 11,703,004 B2* | 7/2023 | Sukegawa | ........... | F02D 41/0097 123/350 |
| 11,761,509 B2* | 9/2023 | Nakano | ................. | F16F 9/3485 188/322.15 |
| 11,781,513 B2* | 10/2023 | Tokuo | ................ | F02M 63/0077 123/445 |
| 11,801,849 B2* | 10/2023 | Fujita | ...................... | B60T 8/885 |
| 11,828,636 B2* | 11/2023 | Ono | ......................... | G01F 1/696 |
| 11,863,245 B2* | 1/2024 | Uematsu | ................ | H04B 3/548 |
| 11,898,508 B2* | 2/2024 | Matohara | ............ | F02D 41/0052 |
| 11,987,254 B2* | 5/2024 | Minakuchi | ........... | B60G 17/015 |
| 12,007,303 B2* | 6/2024 | Ito | ............................ | G01M 3/04 |
| 2003/0070650 A1* | 4/2003 | Ishikawa | ............... | F02D 41/403 123/456 |
| 2003/0150420 A1* | 8/2003 | Ishikawa | ............. | F02D 41/0057 123/305 |
| 2005/0117424 A1* | 6/2005 | Sung | ....................... | G11C 7/065 365/205 |
| 2005/0135566 A1* | 6/2005 | Schmidt | ................ | H04L 1/0003 379/1.04 |
| 2009/0059686 A1* | 3/2009 | Sung | ......................... | G11C 7/08 365/189.11 |
| 2012/0306895 A1* | 12/2012 | Faulkner | .................. | H04B 3/46 379/27.01 |
| 2012/0307982 A1* | 12/2012 | Faulkner | .................. | H04B 3/46 379/27.01 |
| 2012/0307983 A1* | 12/2012 | Faulkner | .................. | H04B 3/46 379/29.1 |
| 2013/0004179 A1* | 1/2013 | Nielsen | ..................... | H04B 3/50 398/115 |
| 2014/0105262 A1* | 4/2014 | Alloin | ................. | H04L 27/2688 375/222 |
| 2014/0233620 A1* | 8/2014 | Bernheim | ......... | H02J 13/00007 375/224 |
| 2014/0233662 A1* | 8/2014 | Hansell | ................... | H04B 3/542 375/258 |
| 2014/0236365 A1* | 8/2014 | Martin | ................ | H04L 43/0847 700/286 |
| 2015/0029036 A1* | 1/2015 | Xiao | ........................ | E21B 47/12 340/855.3 |
| 2015/0145324 A1* | 5/2015 | Heath | ............... | H04L 12/40045 307/1 |
| 2015/0189075 A1* | 7/2015 | Hwang | ................... | H04M 3/30 379/1.03 |
| 2016/0204991 A1* | 7/2016 | Martin | ................ | H04L 41/083 709/220 |
| 2016/0285511 A1* | 9/2016 | Hansell | ............. | H02J 13/00007 |
| 2016/0330062 A1* | 11/2016 | Alloin | ...................... | H04B 3/46 |
| 2017/0237574 A1* | 8/2017 | Heath | ................ | H04L 12/10 307/1 |
| 2017/0237575 A1* | 8/2017 | Heath | ............... | H04L 12/40045 307/1 |
| 2019/0199401 A1* | 6/2019 | Pandey | .................... | H04B 3/28 |
| 2019/0245337 A1* | 8/2019 | Oda | .................. | H02H 1/0092 |
| 2020/0186193 A1* | 6/2020 | Hansell | ................... | H04B 3/54 |
| 2021/0359550 A1* | 11/2021 | Budgett | ................... | H03K 5/01 |
| 2022/0094028 A1* | 3/2022 | Uematsu | ................... | H01P 5/12 |
| 2022/0345060 A1* | 10/2022 | Hara | ..................... | H02M 1/327 |
| 2022/0412427 A1* | 12/2022 | Nakano | ................... | F16F 9/185 |
| 2023/0016942 A1* | 1/2023 | Sukegawa | ........... | F02D 41/1498 |
| 2023/0029119 A1* | 1/2023 | Tokuo | ................... | F02M 63/007 |
| 2023/0035063 A1* | 2/2023 | Hara | ..................... | H02M 7/5387 |
| 2023/0079968 A1* | 3/2023 | Nakano | ...................... | F16F 9/34 188/322.13 |
| 2023/0141601 A1* | 5/2023 | Hara | ....................... | B60L 15/06 318/504 |
| 2023/0216540 A1* | 7/2023 | Uematsu | .................. | H04B 3/46 375/257 |
| 2023/0287955 A1* | 9/2023 | Nakano | .................... | F16F 9/466 |
| 2023/0412209 A1* | 12/2023 | Uematsu | ............ | H04L 25/0282 |
| 2024/0027245 A1* | 1/2024 | Araki | ..................... | F02D 41/18 |

* cited by examiner

FIG. 3

| | POWER POTENTIAL | P-SIDE WAVEFORM | N-SIDE WAVEFORM | DIFFERENTIAL AMPLITUDE AT TRANSMISSION END | DIFFERENTIAL AMPLITUDE AT RECEPTION END | AFTER EQUALIZER |
|---|---|---|---|---|---|---|
| USUAL TRANSMISSION (NO FAILURE) | AS USUAL | AS USUAL | AS USUAL | P-N | | |
| SHORT-CIRCUIT FAILURE ON ONE FILTER SIDE (POWER SUPPLY SIDE) | AS USUAL | FIXED TO High POTENTIAL | AS USUAL | P-N -6dB | DIFFICULT TO DETECT AMPLITUDE | DIFFICULT TO ACCURATELY ASCERTAIN DIFFERENCE |

FIG. 4

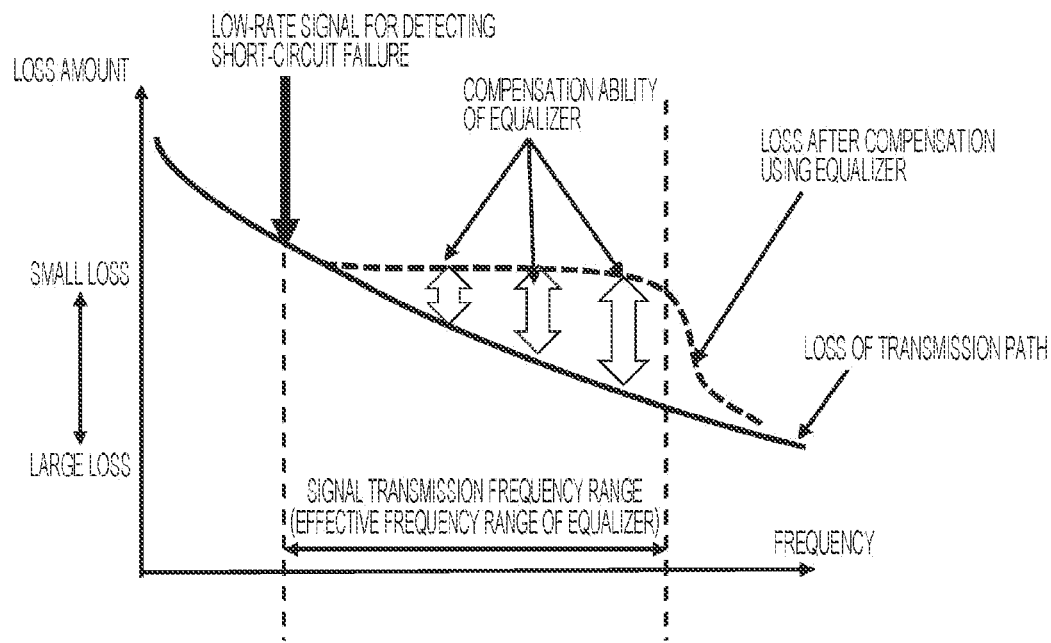

FIG. 9

| # | FAILURE LOCATION | SIGNAL DIRECTION | AMPLITUDE | FEATURES |
|---|---|---|---|---|
| 1 | POWER SUPPLYING CIRCUIT SIDE FILTER | POWER SUPPLYING SIDE ↓ POWER DISTRIBUTION SIDE | AMPLITUDE HAS DECREASED TO HALF OR LESS OF AMPLITUDE AT NORMAL TIME | POTENTIAL DIFFERENCE IS REDUCED DUE TO CROSSTALK TO FILTER FAILURE SIDE WIRING |
| 2 | POWER SUPPLYING CIRCUIT SIDE FILTER | POWER DISTRIBUTION SIDE ↓ POWER SUPPLYING SIDE | HALF OF AMPLITUDE AT NORMAL TIME | POTENTIAL NEAR LSI RECEIVER IS FIXED |
| 3 | POWER DISTRIBUTION CIRCUIT SIDE FILTER | POWER SUPPLYING SIDE ↓ POWER DISTRIBUTION SIDE | HALF OF AMPLITUDE AT NORMAL TIME | POTENTIAL NEAR LSI RECEIVER IS FIXED |
| 4 | POWER DISTRIBUTION CIRCUIT SIDE FILTER | POWER DISTRIBUTION SIDE ↓ POWER SUPPLYING SIDE | AMPLITUDE HAS DECREASED TO HALF OR LESS OF AMPLITUDE AT NORMAL TIME | POTENTIAL DIFFERENCE IS REDUCED DUE TO CROSSTALK TO FILTER FAILURE SIDE WIRING |

SIGNAL TRANSMISSION DEVICE, SIGNAL TRANSMISSION SYSTEM, AND INFORMATION PROVISION METHOD

TECHNICAL FIELD

The present invention relates to a signal transmission device, a signal transmission system, and an information provision method.

BACKGROUND ART

In recent years, in order to reduce the weight and cost of a wire harness in signal transmission between devices mounted on a vehicle, a transmission method called power over data lines (PoDL) that realizes signal transmission and the supply of power by using a twisted pair cable has been proposed. In PoDL, a signal and power are separated by using a filter circuit called a PoDL filter mounted on each of a transmission side device and a reception side device, so that the signal and the power can flow in a twisted pair cable in a superimposed manner without adversely affecting signal quality.

In the case of employing PoDL, if the PoDL filter fails, a signal cannot be correctly transmitted, and thus it is necessary to reliably detect the failure of the PoDL filter.

As a background art related to the present invention, PTL 1 is known. PTL 1 discloses a system in which electronic devices are connected via a twisted pair cable, and a differential signal and power are superimposed on the twisted pair cable and transmitted. In this system, a DC cut-off capacitor is disposed on a signal line, and a filter element such as a common mode choke coil or an inductor is inserted as a PoDL filter on a power line. Consequently, the signal and the power are separated according to a frequency range of the filter element.

CITATION LIST

Patent Literature

PTL 1: U.S. Pat. No. 10,594,519

SUMMARY OF INVENTION

Technical Problem

The technique in PTL 1 reduces leakage of common mode noise from a circuit on a wiring board to a twisted pair cable and also suppresses propagation of common mode noise picked up by the twisted pair cable to the circuit on the wiring board by disposing a filter element between a communication circuit and the twisted pair cable. However, in the technique in PTL 1, a failure of a filter circuit used as a PoDL filter cannot be detected.

Solution to Problem

According to the present invention, there is provided a signal transmission device connected to an electronic device via a differential wiring including a pair of electric wires, the signal transmission device including a communication unit that performs communication using differential transmission with the electronic device via the differential wiring; and a signal processing unit that performs signal processing related to the communication, in which each of the electronic device and the signal transmission device includes a power supply unit that supplies a power supply current via the differential wiring, and a filter circuit electrically connected between the differential wiring and the power supply unit, the communication unit is capable of receiving, via the differential wiring, communication signals transmitted from the electronic device at each of a plurality of signal transmission rates including at least a first signal transmission rate and a second signal transmission rate lower than the first signal transmission rate, the communication unit measures an amplitude of the communication signals received from the electronic device at the second signal transmission rate, and the signal processing unit detects a short-circuit failure of the filter circuit on the basis of the amplitude measured by the communication unit.

According to the present invention, there is provided a signal transmission system including a first electronic device; and a second electronic device connected to the first electronic device via a differential wiring including a pair of electric wires, in which the first electronic device includes a pair of first signal wirings connected to the differential wiring, a first communication unit that performs communication using differential transmission with the second electronic device via the first signal wirings and the differential wiring, a first power supply unit that supplies a power supply current via the differential wiring, and a first filter circuit that includes a pair of filter elements respectively connected between the pair of first signal wirings and the first power supply unit, the second electronic device includes a pair of second signal wirings connected to the differential wiring, a second communication unit that performs communication with the first electronic device via the second signal wirings and the differential wiring, a second signal processing unit that performs signal processing related to the communication, a second power supply unit that supplies the power supply current via the differential wiring, and a second filter circuit that includes a pair of filter elements respectively connected between the pair of second signal wirings and the second power supply unit, the first communication unit transmits communication signals at each of a plurality of signal transmission rates including at least a first signal transmission rate and a second signal transmission rate lower than the first signal transmission rate, the second communication unit receives the communication signals transmitted from the first communication unit via the differential wiring and measures an amplitude of the communication signals received at the second signal transmission rate, and the second signal processing unit detects a short-circuit failure of the first filter circuit or the second filter circuit on the basis of the amplitude measured by the second communication unit.

According to the present invention, there is provided an information provision method using the signal transmission system described above, the signal transmission system being mounted on an automobile including an in-vehicle network and a communication device that is connected to the in-vehicle network and performs wireless communication, the information provision method including transmitting, in a case where the second signal processing unit detects the short-circuit failure, failure information regarding the short-circuit failure from the second electronic device to the communication device via the in-vehicle network; transmitting the failure information to a server device installed in a location different from a location of the automobile through the wireless communication performed by the communication device; acquiring failure target component information regarding the first filter circuit or the second filter circuit in which the short-circuit failure has occurred by using a database registered in advance by the server device; making an inquiry, on the basis of the failure target component information, from the server device to a maintenance company that repairs the automobile about whether or not repair is possible; transmitting recommended repair information based on a result of the inquiry from the server device; and providing information regarding repair of the short-circuit failure to a user of the automobile on the basis of the recommended repair information transmitted from the server device.

Advantageous Effects of Invention

According to the present invention, it is possible to detect a failure of a filter circuit used as a PoDL filter.

Problems, configurations, and effects other than those described above will be clarified in the following description of embodiments for carrying out the invention.

BRIEF DESCRIPTION OF DRAWINGS

FIG. 3 is a table illustrating an aspect of a change in a communication signal depending on the presence or absence of a short-circuit failure of a filter circuit.

FIG. 4 is an explanatory diagram of loss compensation using a waveform equivalent circuit.

FIG. 9 is a table illustrating a relationship between an occurrence location of a short-circuit failure of a PoDL filter and a change in a received signal in a test mode.

DESCRIPTION OF EMBODIMENTS

Figure 1:
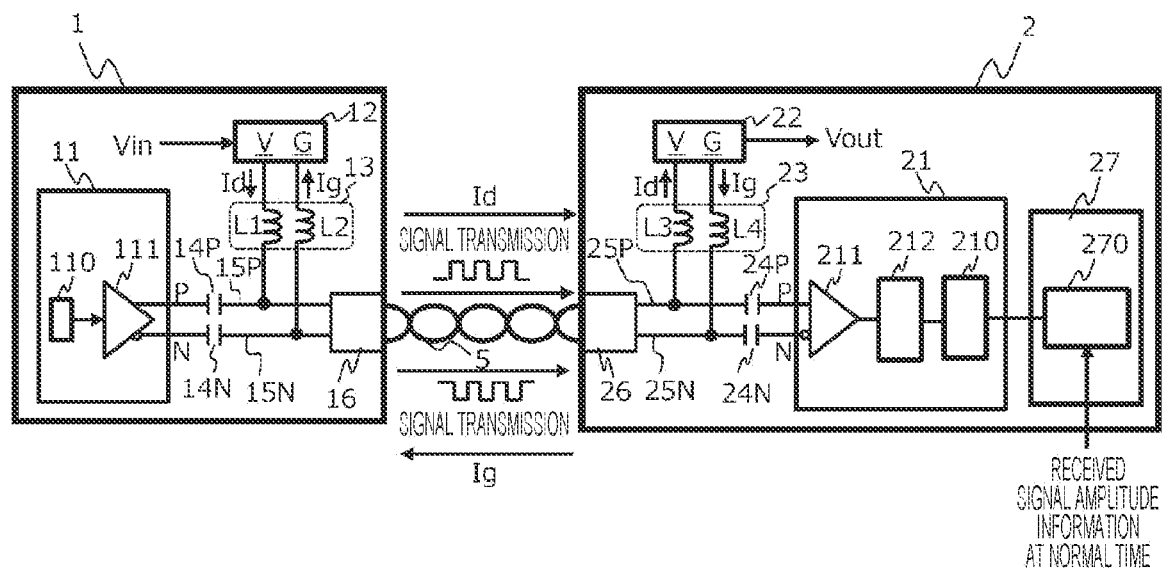
FIG. 1 is a diagram illustrating a configuration of a signal transmission system according to a first embodiment of the present invention.

Hereinafter, embodiments of the present invention will be described with reference to the drawings. The following description and drawings are examples for describing the present invention, and are omitted and simplified as appropriate for the sake of clarity of description. The present invention can be carried out in various other forms. Unless otherwise specified, each constituent may be singular or plural.

Positions, sizes, shapes, ranges, and the like of the constituents illustrated in the drawings may not represent actual positions, sizes, shapes, ranges, and the like in order to facilitate understanding of the invention. Therefore, the present invention is not necessarily limited to positions, sizes, shapes, ranges, and the like illustrated in the drawings.

In a case where there is a plurality of constituents having the same or similar functions, the same reference numerals may be attached with different subscripts in the description. However, in a case where it is not necessary to distinguish the plurality of constituents, the subscripts may be omitted from the description.

In the following description, processing performed by executing a program may be described. However, the program is executed by a processor (for example, a CPU or a GPU) to perform predetermined processing by using a storage resource (for example, a memory) and/or an interface device (for example, a communication port) as appropriate. Therefore, a subject of the processing may be a processor. Similarly, the subject of the processing performed by executing the program may be a controller, a device, a system, a computer, or a node having the processor. The subject of the processing performed by executing the program may be a calculation unit, and may include a dedicated circuit (for example, an FPGA or an ASIC) that performs specific processing.

The program may be installed in a device such as a computer from a program source. The program source may be, for example, a program distribution server or a computer-readable storage medium. In a case where the program source is a program distribution server, the program distribution server may include a processor and a storage resource that stores a distribution target program, and the processor of the program distribution server may distribute the distribution target program to another computer. In the following description, two or more programs may be realized as one program, or one program may be realized as two or more programs.

First Embodiment

FIG. 1 is a diagram illustrating a configuration of a signal transmission system according to a first embodiment of the present invention. A signal transmission system 100 illustrated in FIG. 1 has a configuration in which an electronic device 1 and a signal transmission device 2 are connected to each other via a differential wiring 5, and signal transmission and the supply of power are performed between the electronic device 1 and the signal transmission device 2 via the differential wiring 5.

The differential wiring 5 is a communication cable for differential transmission including a pair of electric wires, and is configured by using, for example, a twisted pair cable. In the following description, it is assumed that signal transmission and the supply of power from the electronic device 1 to the signal transmission device 2 are performed, the electronic device 1 is a transmission side of a communication signal and a power supplying side, and the signal transmission device 2 is a reception side of the communication signal and a reception side of the power, but a combination of a signal transmission direction and a power supply direction is not limited thereto. For example, in contrast to this, the signal transmission device 2 may be a transmission side of a communication signal and a power supplying side, and the electronic device 1 may be a reception side of the communication signal and a reception side of the power, or a signal transmission direction and a power supply direction may be different.

The signal transmission device 2 is a type of electronic device, and realizes various functions by performing communication with the electronic device 1 or another electronic device. For example, in a case where an electronic control unit (ECU) that performs image processing for automated driving is used as the electronic device 1, the electronic device 1 receives an image signal transmitted from a camera installed in a vehicle, and performs various types of image processing related to automated driving of the vehicle on the basis of the received image signal. An image processing result, for example, an object recognition result is transmitted to the signal transmission device 2 via the differential wiring 5. The signal transmission device 2 performs processing related to vehicle control on the basis of the image processing result received from the electronic device 1.

The electronic device 1 includes a communication unit 11, a power supply unit 12, a filter circuit 13, capacitors 14P and 14N, signal wirings 15P and 15N, and a connector 16. The signal transmission device 2 includes a communication unit 21, a power supply unit 22, a filter circuit 23, capacitors 24P and 24N, signal wirings 25P and 25N, a connector 26, and a signal processing unit 27.

The communication unit 11 includes a communication control unit 110 and a differential transmission circuit 111. The differential transmission circuit 111 is connected to the signal wirings 15P and 15N via capacitors 14P and 14N, respectively. The signal wirings 15P and 15N are respectively connected to a pair of electric wires configuring the differential wiring 5 via the connector 16. On the basis of communication data input from the communication control unit 110, the differential transmission circuit 111 outputs communication signals of which polarities are inverted to the signal wiring 15P and the signal wiring 15N, respectively. The communication signals output from the differential transmission circuit 111 to the signal wirings 15P and 15N are, for example, serial signals representing "1" and "0" of data by using a voltage difference, and a voltage changes every predetermined period. A signal transmission rate of the communication signals is determined according to a cycle of the voltage change, and the shorter the cycle, the higher the signal transmission rate. As a result, the communication unit 11 can perform communication using differential transmission with the signal transmission device 2 via the signal wirings 15P and 15N and the differential wiring 5.

The communication unit 21 includes a reception processing unit 210, a differential reception circuit 211, and a waveform equivalent circuit 212. The differential reception circuit 211 is connected to the signal wirings 25P and 25N via capacitors 24P and 24N, respectively. The signal wirings 25P and 25N are respectively connected to a pair of electric wires configuring the differential wiring 5 via the connector 26.

The communication signals transmitted from the electronic device 1 to the signal transmission device 2 via the differential wiring 5 are input to the communication unit 21 via the connector 26, the signal wirings 25P and 25N, and the capacitors 24P and 24N. The differential reception circuit 211 receives the communication signals input to the communication unit 21 and outputs the communication signals to the waveform equivalent circuit 212. The waveform equivalent circuit 212 compensates for attenuation of the signals due to the differential wiring 5 by adjusting waveforms of the communication signals received by the differential reception circuit 211 according to frequency characteristics of the differential wiring 5. Such a function of the waveform equivalent circuit 212 is called an equalizer function and can be realized by a known circuit configuration, and thus a detailed description thereof will be omitted.

The communication signals adjusted by the waveform equivalent circuit 212 are output to the reception processing unit 210. The reception processing unit 210 decodes communication data included in the received communication signals, measures an amplitude of the communication signals, and outputs such information to the signal processing unit 27. As a result, the communication unit 21 can perform communication using differential transmission with the electronic device 1 via the signal wirings 25P and 25N and the differential wiring 5.

The signal processing unit 27 is a unit that performs various types of signal processing on the basis of the communication data decoded from the communication signals by the reception processing unit 210, and is realized by using, for example, a microcomputer that executes a predetermined program or an integrated circuit such as an LSI, an FPGA, or an ASIC. The signal processing unit 27 includes a filter state determination unit 270 as a part of its function. The filter state determination unit 270 detects failures of the filter circuits 13 and 23 on the basis of the amplitude of the communication signals measured by the reception processing unit 210, and performs processing according to the detection result. Details of a method of detecting failures of the filter circuits 13 and 23 using the filter state determination unit 270 will be described later.

In the communication unit 11 of the electronic device 1, the communication control unit 110 has a function of changing a signal transmission rate of communication signals transmitted from the electronic device 1 to the signal transmission device 2 via the differential wiring 5. For example, by changing a communication rate of communication data output from the communication control unit 110 to the differential transmission circuit 111, a cycle of the communication signals output from the differential transmission circuit 111 to the signal wirings 15P and 15N is changed, and thus a signal transmission rate of the communication signals is changed. In this case, in the communication unit 21 of the signal transmission device 2, operations of the differential reception circuit 211, the waveform equivalent circuit 212, and the reception processing unit 210 are changed as necessary according to the change in the signal transmission rate of the communication signals transmitted from the electronic device 1. As a result, the communication unit 21 can receive the communication signals transmitted from the electronic device 1 at different signal transmission rates via the differential wiring 5, and the communication unit 21 can decode communication data and measure amplitude of the communication signals.

In the electronic device 1, the power supply unit 12 generates a DC power supply current Id by using a power supply voltage Vin input from the outside, and outputs the generated power supply current Id from a power supply terminal V to the differential wiring 5 via the filter circuit 13, the signal wiring 15P, and the connector 16. As a result, the power supply current Id is superimposed on the communication signals in the differential wiring 5, the power supply current Id flows in the direction from the electronic device 1 to the signal transmission device 2, and the power supply current Id is supplied to the signal transmission device 2.

The power supply current Id supplied from the electronic device 1 to the signal transmission device 2 via the differential wiring 5 is input to a power supply terminal V of the power supply unit 22 via the connector 26, the signal wiring 25P, and the filter circuit 23. The power supply unit 22 generates a power supply voltage Vout by using the input power supply current Id and outputs the power supply voltage Vout to each part of the signal transmission device 2 including the communication unit 21 and the signal processing unit 27. As a result, the power supply current Id supplied from the electronic device 1 is distributed to the communication unit 21 and the signal processing unit 27.

As described above, in a case where the power supply current Id flows from the power supply unit 12 of the electronic device 1 to the power supply unit 22 of the signal transmission device 2, a ground current Ig corresponding to the power supply current Id flows in a direction opposite to the power supply current Id, that is, from the power supply unit 22 of the signal transmission device 2 toward the power supply unit 12 of the electronic device 1. The ground current Ig is output from a ground terminal G of the power supply unit 22 to the differential wiring 5 via the filter circuit 23, the signal wiring 25N, and the connector 26, and is superimposed on the communication signals in the differential wiring 5. The ground current Ig input to the electronic device 1 is input to a ground terminal G of the power supply unit 12 via the connector 16, the signal wiring 15N, and the filter circuit 13.

The filter circuit 13 is electrically connected between the differential wiring 5 and the power supply unit 12. The filter circuit 13 includes, as filter elements, an inductor L1 connected between the signal wiring 15P and the power supply terminal V of the power supply unit 12, and an inductor L2 connected between the signal wiring 15N and the ground terminal G of the power supply unit 12. The filter circuit 13 functions as a low-pass filter (PoDL filter) that passes the power supply current Id output from the power supply unit 12 and the ground current Ig input to the power supply unit 12 and cuts off communication signals transmitted from the electronic device 1 to the signal transmission device 2 via the differential wiring 5. In the filter circuit 13, the inductor L1 and the inductor L2 function as filter elements having the same frequency characteristics.

The filter circuit 23 is electrically connected between the differential wiring 5 and the power supply unit 22. The filter circuit 23 includes, as filter elements, an inductor L3 connected between the signal wiring 25P and the power supply terminal V of the power supply unit 22, and an inductor L4 connected between the signal wiring 25N and the ground terminal G of the power supply unit 22. The filter circuit 23 functions as a low-pass filter (PoDL filter) that passes the power supply current Id input to the power supply unit 22 and the ground current Ig output from the power supply unit 12 and cuts off communication signals transmitted from the electronic device 1 to the signal transmission device 2 via the differential wiring 5. In the filter circuit 23, the inductor L3 and the inductor L4 function as filter elements having the same frequency characteristics.

In the example in FIG. 1, the filter circuit 13 is configured by the two inductors L1 and L2, and the filter circuit 23 is configured by the two inductors L3 and L4, but the number of inductors configuring the filter circuits 13 and 23 is not limited thereto, and the filter circuits 13 and 23 may be configured by using three or more inductors. The filter circuits 13 and 23 may be configured by using components other than inductors. As long as a PoDL filter that passes the power supply current Id and the ground current Ig and cuts off communication signals can be realized, the filter circuits 13 and 23 may be configured by using any number and system of filters.

The capacitors 14P and 14N are respectively connected between the signal wirings 15P and 15N and the communication unit 11, and function as a high-pass filter that passes communication signals transmitted from the electronic device 1 to the signal transmission device 2 via the differential wiring 5 and cuts off the power supply current Id output from the power supply unit 12 and the ground current Ig input to the power supply unit 12. The capacitors 24P and 24N are respectively connected between the signal wirings 25P and 25N and the communication unit 21, and function as a high-pass filter that passes communication signals transmitted from the electronic device 1 to the signal transmission device 2 via the differential wiring 5 and cuts off the power supply current Id input to the power supply unit 22 and the ground current Ig output from the power supply unit 12.

Next, a failure detection method for the filter circuits 13 and 23 in the signal transmission system 100 according to the first embodiment of the present invention will be described with reference to FIGS. 2, 3, and 4 through comparison with a conventional signal transmission system.

Figure 2:
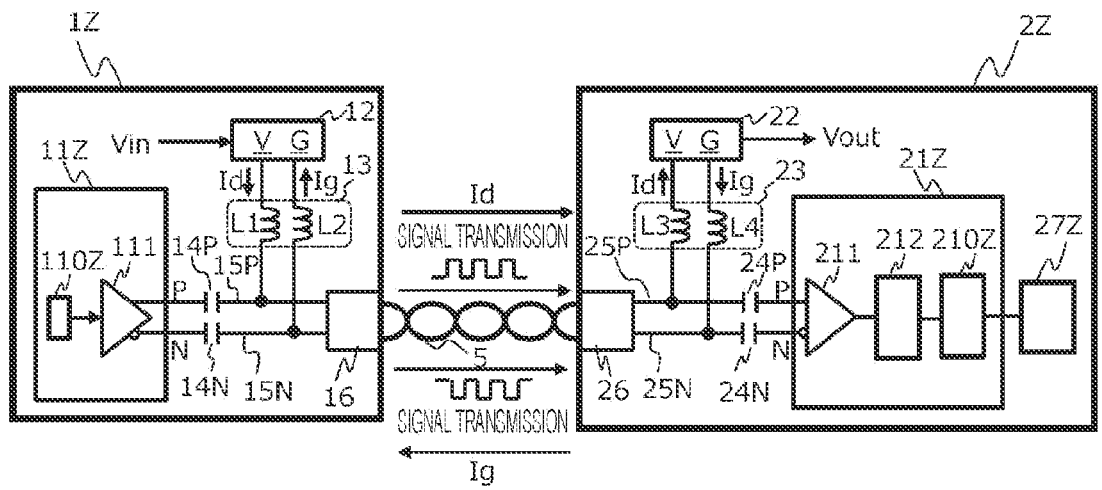
FIG. 2 is a diagram illustrating a configuration example of a conventional signal transmission system.

FIG. 2 is a diagram illustrating a configuration example of a conventional signal transmission system 100Z. In the signal transmission system 100Z illustrated in FIG. 2, similarly to the signal transmission system 100 illustrated in FIG. 1, an electronic device 1Z and a signal transmission device 2Z are connected to each other via the differential wiring 5. The signal transmission system 100Z is different from the signal transmission system 100 in FIG. 1 in that a communication unit 11Z of the electronic device 1Z includes a communication control unit 110Z having no function of changing a communication signal transmission rate, a communication unit 21Z of the signal transmission device 2Z includes a reception processing unit 210Z having no function of measuring an amplitude of communication signals, and a signal processing unit 27Z of the signal transmission device 2Z does not include the filter state determination unit 270.

In the configuration of the signal transmission system 100Z in FIG. 2, it is difficult to detect failures of the filter circuits 13 and 23 as described below with reference to FIG. 3.

As described in FIG. 1, the filter circuits 13 and 23 that are PoDL filters are configured by the inductors L1 and L2 respectively connected between the power supply unit 12 and the signal wirings 15P and 15N, and the inductors L3 and L4 respectively connected between the power supply unit 22 and the signal wirings 25P and 25N. As faults of these filter circuits 13 and 23, two cases of an open failure and a short-circuit failure in any of the inductors L1 to L4 are considered. Here, in a case where any of the inductors L1 to L4 has an open failure, a current line from the power supply current Id to the ground current Ig is disconnected, and the supply of power from the electronic device 1Z to the signal transmission device 2Z is stopped. Therefore, by detecting this, it is possible to easily detect that any of the filter circuits 13 and 23 has failed. On the other hand, in a case where any one of the inductors L1 to L4 has a short-circuit failure, the inductors cannot function any longer as a low-pass filter that cuts off communication signals transmitted from the electronic device 1Z to the signal transmission device 2Z via the differential wiring 5, and thus the communication signals are affected, but power is supplied from the electronic device 1Z to the signal transmission device 2Z without any problem. Therefore, in order to reliably detect failures of the filter circuits 13 and 23, it is an important whether a short-circuit failure of the inductors L1 to L4 can be detected from changes in the communication signals.

FIG. 3 is a table illustrating an aspect in which communication signals change due to the presence or absence of a short-circuit failure of the filter circuit 13. In the table in FIG. 3, an example of a transmission waveform at each observation point of the electronic device 1Z and the signal transmission device 2Z during normal transmission, that is, in a case where the filter circuit 13 of the electronic device 1Z does not fail is illustrated in the first row, and an example of a transmission waveform at each observation point of the electronic device 1Z and the signal transmission device 2Z in a case where the inductor L1 on the power supplying side in the filter circuit 13 of the electronic device 1Z has a short-circuit failure is illustrated in the second row. Specifically, examples of a power supply potential (a DC voltage level of the power supply current Id), a P-side waveform (a voltage waveform of the signal wiring 15P at the time of transmitting the communication signals), an N-side waveform (a voltage waveform of the signal wiring 15N at the time of transmitting the communication signals), a differential amplitude on the transmission end side (a potential difference between the signal wiring 15P and the signal wiring 15N at the time of transmitting the communication signals), a differential waveform on the reception end side (a potential difference between the signal wiring 25P and the signal wiring 25N at the time of receiving the communication signals), and a reception waveform after the equalizer (an output waveform from the waveform equivalent circuit 212) are illustrated.

As can be seen from the table in FIG. 3, since the power supply potential does not change depending on the presence or absence of a short-circuit failure of the inductor L1, it is not possible to detect a failure of the inductor L1 through a voltage change of the power supply current Id. On the other hand, in a case where the inductor L1 has a short-circuit failure, a potential of the P-side waveform is fixed, so that the differential amplitude on the transmission end side is halved (−6 dB). However, this is smaller than the loss compensation amount (about 12 dB to 25 dB) by the general equalizer function of the waveform equivalent circuit 212, and corresponds to an attenuation amount that can be sufficiently compensated for by the waveform equivalent circuit 212. Thus, in consideration of a variation or the like in the attenuation amount due to the differential wiring 5, it can be seen that it is difficult to accurately detect an amplitude difference of the communication signals due to the presence or absence of the short-circuit failure of the inductor L1 in the reception waveform after the equalizer output from the waveform equivalent circuit 212.

FIG. 4 is an explanatory diagram of loss compensation using the waveform equivalent circuit 212. During normal communication in which communication signals are transmitted at a high rate, as indicated by a solid line in FIG. 4, a loss of a transmission path including the differential wiring 5 increases as a frequency (transmission rate) of the communication signals increases. A difference in the loss amount for each frequency affects communication signal waveforms, so that inter-symbol interference occurs in the communication signals, and the quality of the communication signals deteriorates. Therefore, in order to reduce such quality degradation in the communication signals, the waveform equivalent circuit 212 sets a transmission frequency range of the communication signals as an effective frequency range of the equalizer function as indicated by a dashed line in FIG. 4, and performs loss compensation such that a loss amount in this frequency range becomes flat on the frequency axis. FIG. 4 illustrates an example of a case where the waveform equivalent circuit 212 performs loss compensation for reducing the loss on the high frequency side, but on the contrary, may perform loss compensation for flattening the loss amount on the frequency axis by increasing the loss on the low frequency side having a small loss amount. Both cases are the same in principle.

As described above, in the configuration of the conventional signal transmission system 100Z illustrated in FIG. 2, it is difficult to detect a short-circuit failure of the inductor L1 in the filter circuit 13 from the change in the reception waveform. The same applies to a case where a short-circuit failure occurs in the other inductors L2 to L4.

Therefore, in the signal transmission system 100 according to the first embodiment of the present invention illustrated in FIG. 1, in a test mode for failure detection, the communication control unit 110 of the electronic device 1 adjusts a signal transmission rate of the communication signals to a low rate such that a lower frequency side than the effective frequency range of the equalizer function in which the waveform equivalent circuit 212 adjusts waveforms of the communication signals to compensate for attenuation due to the differential wiring 5, that is, a frequency range in which the ability of loss compensation using the equalizer is not sufficient is obtained. In this case, in a case where the signal transmission rate before adjustment in a usual time is T1 and the signal transmission rate after adjustment in the test mode is T2, T1>T2. As a result, as communication signals from the electronic device 1 to the signal transmission device 2, low-rate signals for short-circuit failure detection illustrated in FIG. 4 are output via the differential wiring 5.

The reception processing unit 210 of the signal transmission device 2 measures an amplitude of the communication signals at the signal transmission rate T2 received by the differential reception circuit 211, and the filter state determination unit 270 compares the measurement result with amplitude information of received signals at the normal time. It is assumed that the amplitude information of the received signals at the normal time is set in the filter state determination unit 270 in advance as an amplitude of the communication signals at the signal transmission rate T2 in a case where the filter circuits 13 and 23 do not have a short-circuit failure. As a result, in a case where the amplitude of the received communication signals is about a half (−6 dB) of the amplitude at the normal time, it is determined that any of the inductors L1 to L4 of the filter circuits 13 and 23 has a short-circuit failure.

In the signal transmission system 100 according to the first embodiment of the present invention, the electronic device 1 and the signal transmission device 2 each perform the above-described processes, and thus, in a case where the filter circuits 13 and 23 have a short-circuit failure, the short-circuit failure can be reliably detected. In a case where an amplitude of the communication signals received by the signal transmission device 2 is measured, it is preferable to adjust a signal transmission rate of the communication signals transmitted from the electronic device 1 such that a frequency of the communication signals at the adjusted signal transmission rate T2 is about 1/20 or less of the fundamental frequency of the communication signals at the signal transmission rate T1 in a usual time.

According to the first embodiment of the present invention described above, the following operational effects are achieved.

(1) The signal transmission device 2 is connected to the electronic device 1 via the differential wiring 5 including a pair of electric wires, and includes the communication unit 21 that performs communication using differential transmission with the electronic device 1 via the differential wiring 5, and the signal processing unit 27 that performs signal processing related to communication. The electronic device 1 and the signal transmission device 2 respectively include the power supply units 12 and 22 that supply the power supply current Id via the differential wiring 5, and the filter circuits 13 and 23 electrically connected between the differential wiring 5 and the power supply units 12 and 22. The communication unit 21 can receive, via the differential wiring 5, communication signals transmitted from the electronic device 1 at a plurality of signal transmission rates including at least the signal transmission rate T1 and the signal transmission rate T2 lower than the signal transmission rate T1. The communication unit 21 causes the reception processing unit 210 to measure an amplitude of the communication signals received from the electronic device 1 at the signal transmission rate T2. The signal processing unit 27 causes the filter state determination unit 270 to detect a short-circuit failure of the filter circuits 13 and 23 on the basis of the amplitude measured by the communication unit 21. With this configuration, it is possible to detect failures of the filter circuits 13 and 23 used as PoDL filters.

(2) The power supply unit 12 included in the electronic device 1 applies a predetermined potential difference between the pair of electric wires of the differential wiring 5 and supplies the power supply current Id to the signal transmission device 2. The power supply unit 22 included in the signal transmission device 2 distributes the power supply current Id supplied from the electronic device 1 to the communication unit 21 and the signal processing unit 27. With this configuration, power is supplied from the electronic device 1 to the signal transmission device 2 via the differential wiring 5, and each part of the signal transmission device 2 can be operated by using the power.

(3) The communication unit 21 has an equalizer function of adjusting the waveforms of the communication signals within a predetermined effective frequency range in the waveform equivalent circuit 212 to compensate for attenuation due to the differential wiring 5. The signal transmission rate T2 is a signal transmission rate at which a frequency of the communication signals are on the lower frequency side than the effective frequency range of the equalizer function. With this configuration, an amplitude of the communication signals can be accurately measured.

(4) The signal transmission rate T2 is preferably a signal transmission rate at which a frequency of the communication signals is 1/20 or less of the fundamental frequency of the communication signals at the signal transmission rate T1. With this configuration, the signal transmission rate can be adjusted with an appropriate value such that the frequency of the communication signals is on the lower frequency side than the effective frequency range of the equalizer function.

(5) The signal transmission system 100 includes the electronic device 1 and the signal transmission device 2 that is an electronic device connected to the electronic device 1 via the differential wiring 5 including a pair of electric wires. The electronic device 1 includes a pair of signal wirings 15P and 15N connected to the differential wiring 5, the communication unit 11 that performs communication using differential transmission with the signal transmission device 2 via the signal wirings 15P and 15N and the differential wiring 5, the power supply unit 12 that supplies the power supply current Id via the differential wiring 5, and the filter circuit 13 having the inductors L1 and L2 which are a pair of filter elements respectively connected between the pair of signal wirings 15P and 15N and the power supply unit 12. The signal transmission device 2 includes a pair of signal wirings 25P and 25N connected to the differential wiring 5, the communication unit 21 that performs communication with the electronic device 1 via the signal wirings 25P and 25N and the differential wiring 5, the signal processing unit 27 that performs signal processing related to communication, the power supply unit 22 that supplies the power supply current Id via the differential wiring 5, and the filter circuit 23 having the inductors L3 and L4 which are a pair of filter elements respectively connected between the pair of signal wirings 25P and 25N and the power supply unit 22. The communication unit 11 transmits communication signals at a plurality of signal transmission rates including at least the signal transmission rate T1 and the signal transmission rate T2 lower than the signal transmission rate T1. In the communication unit 21, the differential reception circuit 211 receives the communication signals transmitted from the communication unit 11 via the differential wiring 5, and the reception processing unit 210 measures an amplitude of the communication signals received at the signal transmission rate T2. The signal processing unit 27 causes the filter state determination unit 270 to detect a short-circuit failure of the filter circuit 13 or the filter circuit 23 on the basis of the amplitude measured by the communication unit 21. With this configuration, in the signal transmission system 100 including the electronic device 1 and the signal transmission device 2, it is possible to detect a short-circuit failure of the filter circuits 13 and 23 used as PoDL filters, respectively.

Second Embodiment

Next, a signal transmission device and a signal transmission system according to a second embodiment of the present invention will be described. In the first embodiment described above, an example has been described in which the electronic device 1 and the signal transmission device 2 are connected to each other via the differential wiring 5, and signal transmission and the supply of power are performed via the differential wiring 5 in the direction from the electronic device 1 to the signal transmission device 2. In contrast, in the present embodiment, an example in which an electronic device 1A and a signal transmission device 2A are connected to each other via the differential wiring 5, signal transmission is performed in a direction from the electronic device 1A to the signal transmission device 2A via the differential wiring 5, and the supply of power is performed in a direction from the signal transmission device 2A to the electronic device 1A via the differential wiring 5 will be described.

Figure 5:
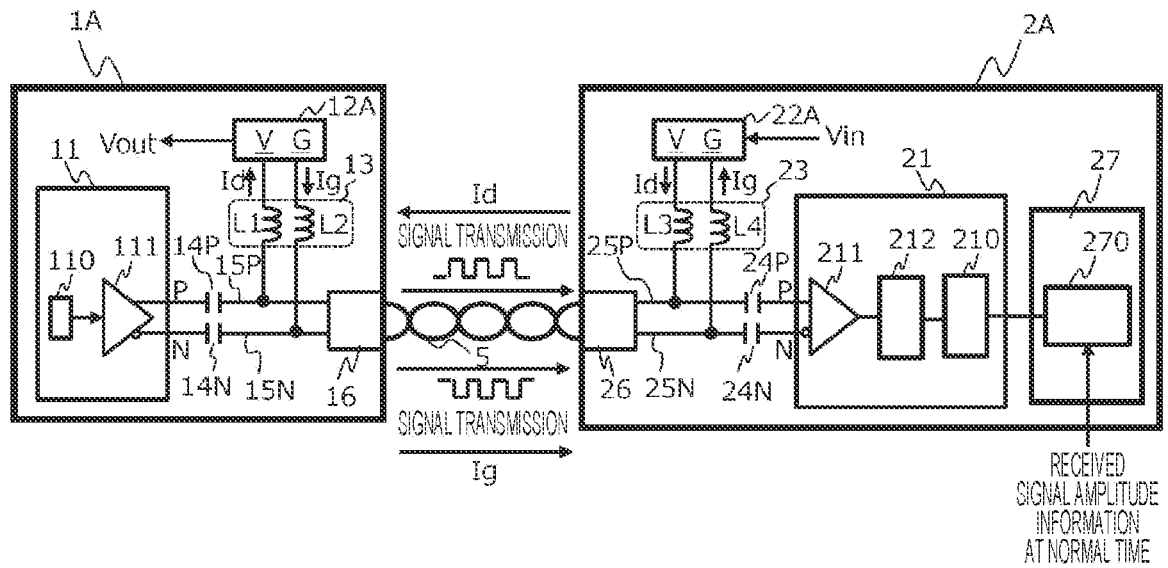
FIG. 5 is a diagram illustrating a configuration of a signal transmission system according to a second embodiment of the present invention.

FIG. 5 is a diagram illustrating a configuration of a signal transmission system according to a second embodiment of the present invention. In a signal transmission system 100A illustrated in FIG. 5, the electronic device 1A and the signal transmission device 2A have the same configurations as those of the electronic device 1 and the signal transmission device 2 of the first embodiment described in FIG. 1 except that power supply units 12A and 22A are provided instead of the power supply units 12 and 22, respectively.

In the present embodiment, the power supply unit 22A generates a DC power supply current Id by using a power supply voltage Vin input from the outside, and outputs the generated power supply current Id from a power supply terminal V to the differential wiring 5 via the filter circuit 23, the signal wiring 25P, and the connector 26. As a result, the power supply current Id is superimposed on the communication signals in the differential wiring 5, the power supply current Id flows in the direction from the signal transmission device 2A to the electronic device 1A, and the power supply current Id is supplied to the electronic device 1A.

The power supply current Id supplied from the signal transmission device 2A to the electronic device 1A via the differential wiring 5 is input to a power supply terminal V of the power supply unit 12A via the connector 16, the signal wiring 15P, and the filter circuit 13. The power supply unit 12A generates a power supply voltage Vout by using the input power supply current Id and outputs the power supply voltage Vout to each part of the electronic device 1A including the communication unit 11. As a result, the power supply current Id supplied from the signal transmission device 2A is distributed to the communication unit 11.

As described above, in a case where the power supply current Id flows from the power supply unit 22A of the signal transmission device 2A to the power supply unit 12A of the electronic device 1A, a ground current Ig corresponding thereto flows in a direction opposite to the power supply current Id, that is, from the power supply unit 12A of the electronic device 1A toward the power supply unit 22A of the signal transmission device 2A. The ground current Ig is output from the ground terminal G of the power supply unit 12A to the differential wiring 5 via the filter circuit 13, the signal wiring 15N, and the connector 16, and is superimposed on the communication signals in the differential wiring 5. The ground current Ig input to the signal transmission device 2A is input to a ground terminal G of the power supply unit 22A via the connector 26, the signal wiring 25N, and the filter circuit 23.

According to the second embodiment of the present invention described above, the power supply unit 22A included in the signal transmission device 2A applies a predetermined potential difference between the pair of electric wires of the differential wiring 5 to supply the power supply current Id to the electronic device 1A. The power supply unit 12A included in the electronic device 1A distributes the power supply current Id supplied from the signal transmission device 2A to the communication unit 11. With this configuration, power is supplied from the signal transmission device 2A to the electronic device 1A via the differential wiring 5, and each part of the electronic device 1A can be operated by using the power.

Third Embodiment

Next, a third embodiment of the present invention will be described. In the present embodiment, an example of a procedure of a test mode for detecting a short-circuit failure of a PoDL filter will be described. In the present embodiment, an example of a case where the test mode is performed in the signal transmission system 100 described in the first embodiment will be described. However, even in a case where the test mode is predetermined in the signal transmission system 100A described in the second embodiment, the test mode may be performed in a similar procedure.

Figure 6:
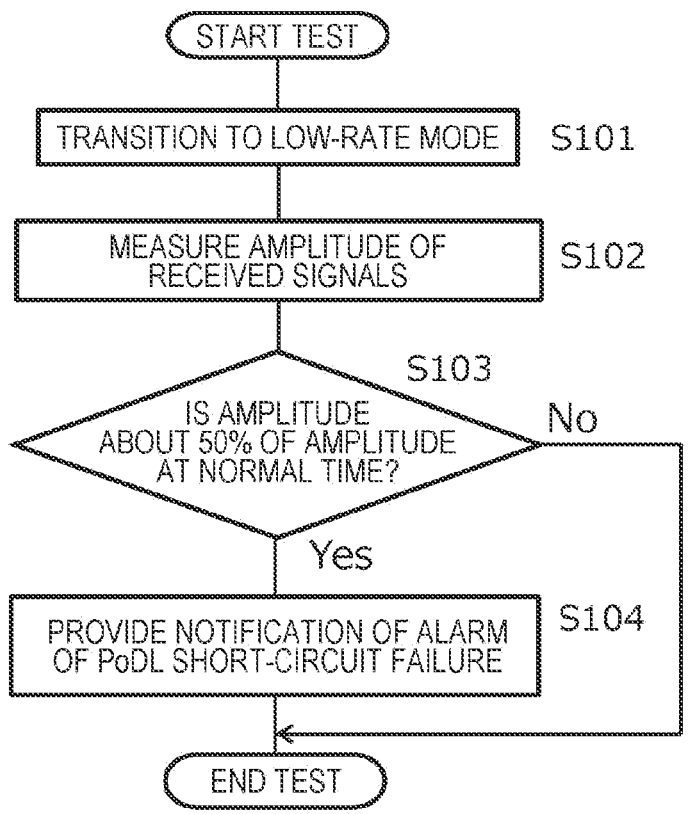
FIG. 6 is a flowchart illustrating a procedure of a test mode according to a third embodiment of the present invention.

FIG. 6 is a flowchart illustrating a procedure of a test mode according to the third embodiment of the present invention. In step S101, the signal transmission system 100 transitions to a test low-rate signal transmission mode by the communication control unit 110 of the electronic device 1 switching a signal transmission rate of the communication signals from the signal transmission rate T1 in a usual time to the low signal transmission rate T2.

Next, in step S102, in the signal transmission system 100, the communication unit 21 of the signal transmission device 2 receives the communication signals transmitted from the electronic device 1 at the signal transmission rate T2, and the reception processing unit 210 measures an amplitude of the received signals.

In step S103, in the signal transmission system 100, the filter state determination unit 270 of the signal transmission device 2 compares the amplitude of the received signals measured in step S102 with preset amplitude of the received signals at the normal time, and determines whether or not the measured amplitude of the received signals is about 50% of the amplitude at the normal time. As a result, in a case where it is determined that the measured amplitude of the received signals has decreased to about 50% of the amplitude at the normal time, an alarm notification indicating that either of the filter circuits 13 and 23 that are PoDL filters has a short-circuit failure is provided in step S104. The alarm notification of the short-circuit failure may be provided to a user of the signal transmission system 100 or a host system on which the signal transmission system 100 is mounted according to any method such as outputting a predetermined sound or image.

In a case where the alarm notification is provided in step S104 or it is determined in step S103 that the measured amplitude of the received signals has not decreased to about 50% of the amplitude at the normal time, the test mode illustrated in the flowchart of FIG. 6 is ended.

Fourth Embodiment

Next, a signal transmission device and a signal transmission system according to a fourth embodiment of the present invention will be described.

Figure 7:
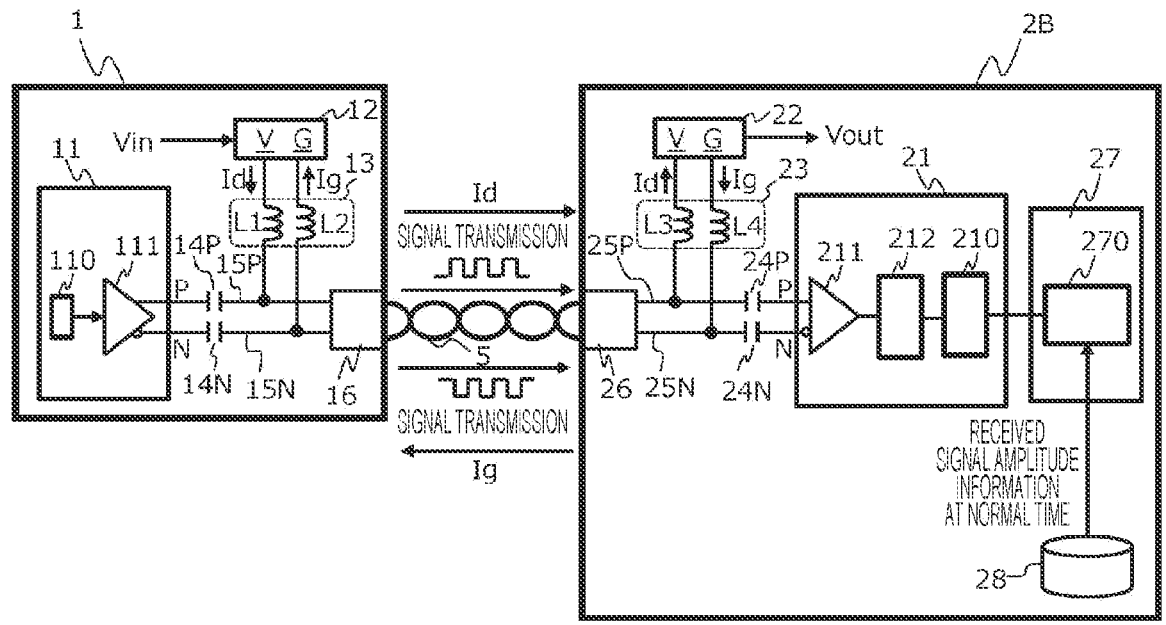
FIG. 7 is a diagram illustrating a configuration of a signal transmission system according to a fourth embodiment of the present invention.

FIG. 7 is a diagram illustrating a configuration of a signal transmission system according to a fourth embodiment of the present invention. In a signal transmission system 100B illustrated in FIG. 7, the electronic device 1 has the same configuration as that of the electronic device 1 of the first embodiment described with reference to FIG. 1. A signal transmission device 2B has the same configuration as that of the signal transmission device 2 of the first embodiment described with reference to FIG. 1 except that the signal transmission device 2B further includes a storage device 28.

In the present embodiment, the storage device 28 of the signal transmission device 2B stores amplitude information regarding an amplitude of communication signals at the normal time when the filter circuits 13 and 23 do have a short-circuit failure. The filter state determination unit 270 reads the amplitude information stored in the storage device 28 and compares the amplitude information with an amplitude of communication signals at the signal transmission rate T2 received by the differential reception circuit 211 and measured by the reception processing unit 210. As a result, similarly to the first embodiment, in a case where the amplitude of the received communication signals is about a half (−6 dB) of the amplitude at the normal time, it is determined that any of the inductors L1 to L4 has a short-circuit failure in the filter circuits 13 and 23.

The storage device 28 preferably stores amplitude information of received signals at the normal time in combination with information such as an amplitude of transmission signals, a signal transmission rate, and a loss of the differential wiring 5. The loss information of the differential wiring 5 may be represented by a loss amount, or may be information indicating loss characteristics of the differential wiring 5, for example, information regarding a loss amount and a length per unit length. Alternatively, information that can specify a loss amount of the differential wiring 5, for example, a model number may be stored in the storage device 28.

For each parameter such as the amplitude of the transmission signals, the signal transmission rate, and the loss of the differential wiring 5, amplitude information for a plurality of combinations having different parameter values may be stored in the storage device 28. That is, in a case where each of the amplitude of the transmission signals, the signal transmission rate, and the loss of the differential wiring 5 changes, the amplitude of the received signals also changes according to such a change. Therefore, in order to accurately detect a short-circuit failure of the filter circuits 13 and 23, it is necessary to compare an amplitude measured from the received signals with the amplitude at the normal time in consideration of a combination of these three parameter values. Therefore, for various combinations of the above three parameter values, the amplitude information at the normal time is stored in the storage device 28, and amplitude information of a combination matching a specification of the signal transmission system 100B is read from the storage device 28 and used for determination of a filter failure performed by the filter state determination unit 270. With this configuration, even in a case where the specification of the signal transmission system 100B changes variously, a short-circuit failure of the filter circuits 13 and 23 can be accurately detected.

According to the fourth embodiment of the present invention described above, the signal transmission device 2B includes the storage device 28 that stores amplitude information regarding an amplitude of communication signals when the filter circuits 13 and 23 do not have a short-circuit failure. The signal processing unit 27 detects a short-circuit failure of the filter circuits 13 and 23 on the basis of an amplitude measured by the communication unit 21 and the amplitude information stored in the storage device 28. With this configuration, a short-circuit failure of the filter circuits 13 and 23 can be accurately detected.

Fifth Embodiment

Next, a signal transmission device and a signal transmission system according to a fifth embodiment of the present invention will be described. In the present embodiment, an example in which an electronic device 1C and a signal transmission device 2C connected via the differential wiring 5 perform bidirectional communication with each other will be described. The electronic device 1C and the signal transmission device 2C of the present embodiment correspond to the electronic device 1 and the signal transmission device 2 described in the first embodiment, respectively, and have partially different configurations. Hereinafter, the electronic device 1C and the signal transmission device 2C will be described focusing on differences from the first embodiment.

Figure 8:
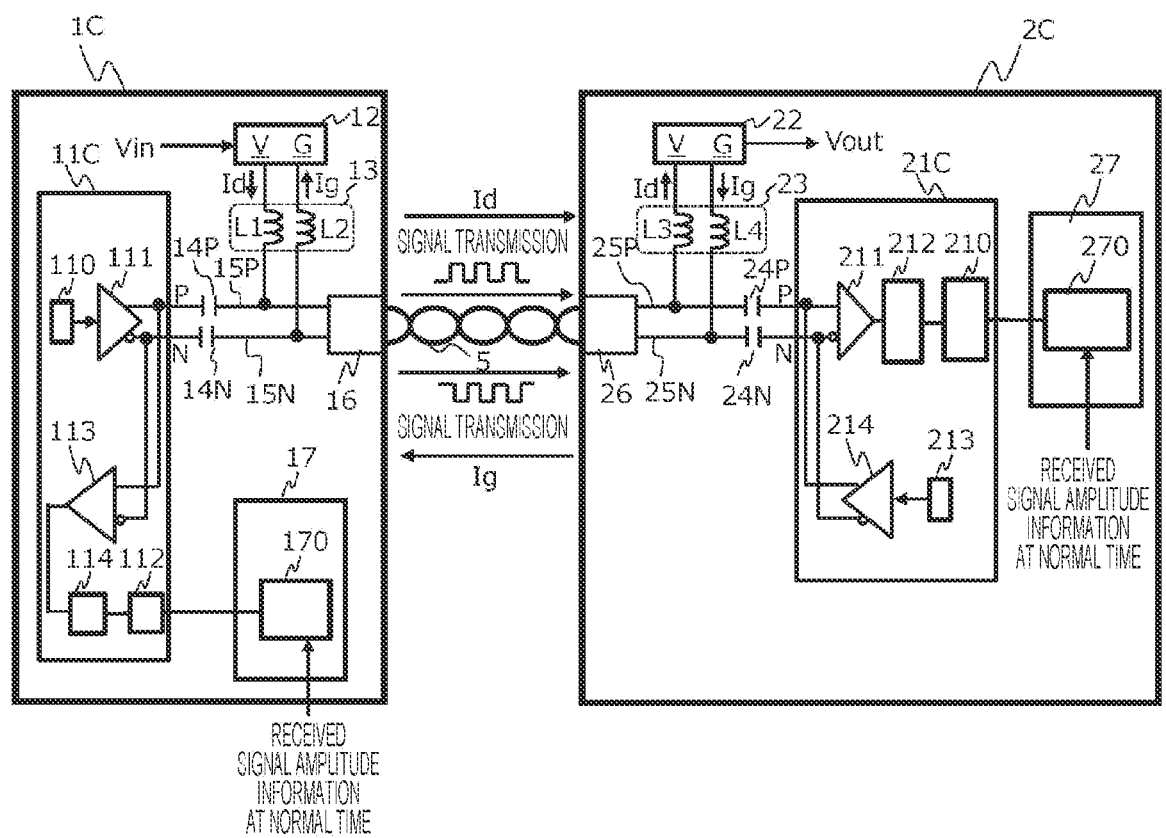
FIG. 8 is a diagram illustrating a configuration of a signal transmission system according to a fifth embodiment of the present invention.

FIG. 8 is a diagram illustrating a configuration of a signal transmission system according to a fifth embodiment of the present invention. In a signal transmission system 100C illustrated in FIG. 8, an electronic device 1C has the same configuration as that of the electronic device 1 of the first embodiment described with reference to FIG. 1 except that a communication unit 11C is included instead of the communication unit 11 and a signal processing unit 17 is further provided. The signal transmission device 2C has the same configuration as that of the signal transmission device 2 of the first embodiment described with reference to FIG. 1 except that a communication unit 21C is provided instead of the communication unit 21.

The communication unit 11C further includes a reception processing unit 112, a differential reception circuit 113, and a waveform equivalent circuit 114 in addition to the communication control unit 110 and the differential transmission circuit 111 described in the first embodiment. The differential reception circuit 113 is connected to the signal wirings 15P and 15N via the capacitors 14P and 14N, respectively. The communication unit 21C further includes a communication control unit 213 and a differential transmission circuit 214 in addition to the reception processing unit 210, the differential reception circuit 211, and the waveform equivalent circuit 212 described in the first embodiment. The differential transmission circuit 214 is connected to the signal wirings 25P and 25N via capacitors 24P and 24N, respectively.

Similarly to the differential transmission circuit 111 of the electronic device 1C, the differential transmission circuit 214 outputs respective communication signals of which polarities are inverted to the signal wiring 25P and the signal wiring 25N on the basis of communication data input from the communication control unit 213. These communication signals are transmitted from the signal transmission device 2C to the electronic device 1C via the differential wiring 5, and are input to the communication unit 11C via the connector 16, the signal wirings 15P and 15N, and the capacitors 14P and 14N. The communication control unit 213 has a function of changing a signal transmission rate of the communication signals transmitted from the signal transmission device 2C, similarly to the communication control unit 110 of the electronic device 1C.

The differential reception circuit 113 receives the communication signals input to the communication unit 11C and outputs the communication signals to the waveform equivalent circuit 114. The waveform equivalent circuit 114 has an equalizer function similarly to the waveform equivalent circuit 212 of the signal transmission device 2C, and compensates for attenuation of the signals due to the differential wiring 5 by adjusting waveforms of the communication signals received by the differential reception circuit 113 according to the frequency characteristics of the differential wiring 5. The communication signals adjusted by the waveform equivalent circuit 114 are output to the reception processing unit 112. The reception processing unit 112 decodes communication data included in the received communication signals, measures an amplitude of the communication signals, and outputs such information to the signal processing unit 17.

Similarly to the signal processing unit 27 of the signal transmission device 2C, the signal processing unit 17 is a unit that performs various types of signal processing on the basis of the communication data decoded from the communication signals by the reception processing unit 112, and is realized by using, for example, a microcomputer that executes a predetermined program or an integrated circuit such as an LSI, an FPGA, or an ASIC. The signal processing unit 17 includes a filter state determination unit 170 as a part of its function. Similarly to the filter state determination unit 270 of the signal transmission device 2C, the filter state determination unit 170 detects failures of the filter circuits 13 and 23 on the basis of the amplitude of the communication signals measured by the reception processing unit 112, and performs processing according to the detection result.

According to the fifth embodiment of the present invention described above, bidirectional communication can be performed between the electronic device 1C and the signal transmission device 2C. Since the filter state determination units 170 and 270 are respectively provided in the electronic device 1C and the signal transmission device 2C, it is possible to detect failures of the filter circuits 13 and 23 in either communication direction.

Sixth Embodiment

Next, a signal transmission device and a signal transmission system according to a sixth embodiment of the present invention will be described. In the present embodiment, an example will be described in which, in a case where a short-circuit failure of a PoDL filter is detected, a device in which the short-circuit failure has occurred is specified. In the present embodiment, bidirectional communication is assumed, and thus an example of a case where a short-circuit failure of a PoDL filter is detected by using the signal transmission system 100C in FIG. 8 described in the fifth embodiment will be described.

FIG. 9 is a table illustrating a relationship between a location where a short-circuit failure occurs in a PoDL filter and a change in a received signal in the test mode. In the table in FIG. 9, a first row (#1) shows an aspect in which an amplitude of received signals changes from the normal time in the signal transmission device 2C on the reception side in a case where communication signals are transmitted from the electronic device 1C to the signal transmission device 2C when a short-circuit failure occurs on the power supplying side, that is, in any of the inductors L1 and L2 of the filter circuit 13 of the electronic device 1C. On the other hand, a second row (#2) shows an aspect of a change in an amplitude of received signals from the normal time in the electronic device 1C on the reception side in a case where communication signals are transmitted from the signal transmission device 2C to the electronic device 1C, contrary to the first row, when a short-circuit failure occurs on the power supplying side, that is, in any of the inductors L1 and L2 of the filter circuit 13 of the electronic device 1C. A third row (#3) shows an aspect of a change in an amplitude of received signals from the normal time in the signal transmission device 2C on the reception side in a case where the communication signals are transmitted from the electronic device 1C to the signal transmission device 2C when a short-circuit failure occurs on the power distribution side, that is, in any of the inductors L3 and L4 of the filter circuit 23 of the signal transmission device 2C. On the other hand, a fourth row (#4) shows an aspect of change in an amplitude of the received signals from the normal time in the electronic device 1C on the reception side in a case where the communication signals are transmitted from the signal transmission device 2C to the electronic device 1C contrary to the third row, when a short-circuit failure occurs in the power distribution side, that is, in any of the inductors L3 and L4 of the filter circuit 23 of the signal transmission device 2C.

From the second and third rows in FIG. 9, it can be seen that even in a case where a supply direction of the power supply current Id and a transmission direction of the communication signals are either the same direction or the opposite direction, in a case where a short-circuit failure occurs in the filter circuit 13 or 23 on the reception side of the communication signals, an amplitude of the received communication signals is about half of the amplitude at the normal time as described in the first embodiment. On the other hand, from the first row and the fourth row in FIG. 9, it can be seen that even in a case where the supply direction of the power supply current Id and the transmission direction of the communication signals are either the same direction or the opposite direction, the amplitude of the received communication signals further decreases to be lower than about half of the amplitude at the normal time in a case where a short-circuit failure occurs in the filter circuit 13 or 23 on the transmission side of the communication signals.

The amplitude decrease of the received signals due to the short-circuit failure of the transmission side filter as described above occurs due to crosstalk between the two electric wires configuring the differential wiring 5. That is, in a case where any one of the inductors L1 to L4 has a short-circuit failure in the filter circuits 13 and 23, a potential of one of the pair of wires of the differential wiring 5 connected to the inductor is fixed as illustrated in the table in FIG. 3. However, due to crosstalk between the electric wires generated at the time of transmission of the communication signals via the differential wiring 5, a voltage variation of the communication signals in the other electric wire is superimposed on one electric wire of which potential is fixed. As a result, a slight potential variation occurs even on one electric wire side, and an amplitude reduction corresponding to the crosstalk influence occurs in received signals. A level of this amplitude reduction is, for example, between 5% and 20%, which is a general crosstalk coefficient of a twisted pair cable.

Therefore, in the present embodiment, when it is determined that a short-circuit failure has occurred in the filter circuits 13 and 23, two test modes in which signal transmission directions are different are executed, and an amplitude of received signals is measured in each mode. The amplitude measurement results are compared with each other to specify a signal transmission direction in which the amplitude of the received signal is smaller, and thus it is determined that a transmission side filter in the signal transmission direction has failed. As a result, it is possible to specify which of the filter circuit 13 and the filter circuit 23 has a short-circuit failure.

Figure 10:
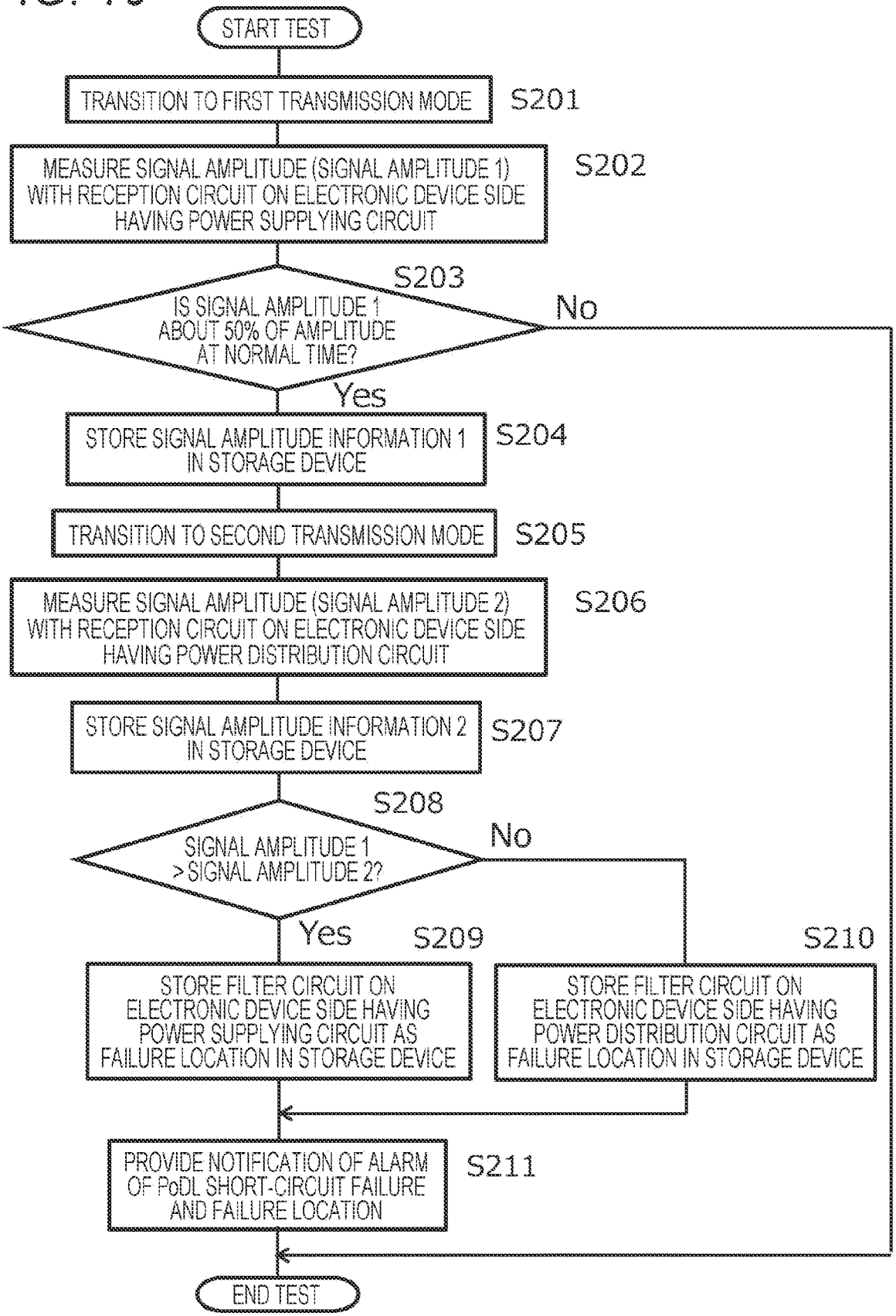
FIG. 10 is a flowchart illustrating a procedure of a test mode according to a sixth embodiment of the present invention.

FIG. 10 is a flowchart illustrating a procedure of a test mode according to the sixth embodiment of the present invention. In step S201, in the signal transmission system 100C, the communication control unit 213 of the signal transmission device 2C switches a signal transmission rate of the communication signals from the signal transmission rate T1 in a usual time to the low signal transmission rate T2. As a result, a transmission mode transitions to a first transmission mode that is a test low-rate signal transmission mode for transmitting communication signals from the signal transmission device 2C on the power distribution side to the electronic device 1C on the power supplying side.

Next, in step S202, in the signal transmission system 100C, the communication unit 11C on the electronic device 1C side including the power supply unit 12 operating as a power supplying circuit that supplies the power supply current Id to the signal transmission device 2C receives the communication signals transmitted from the signal transmission device 2C at the signal transmission rate T2, and the reception processing unit 112 measures an amplitude of the received signals. Hereinafter, the amplitude of the received signals measured in step S202 will be referred to as "signal amplitude 1".

In step S203, in the signal transmission system 100C, the filter state determination unit 170 of the electronic device 1C compares the signal amplitude 1 measured in step S202 with the preset amplitude of the received signals at the normal time, and determines whether or not the signal amplitude 1 is about 50% of the amplitude at the normal time. As a result, in a case where it is determined that the signal amplitude 1 has decreased to about 50% of the amplitude at the normal time, the process proceeds to step S204, and otherwise, the test mode illustrated in the flowchart of FIG. 10 is ended.

In step S204, the signal transmission system 100C stores information regarding the signal amplitude 1 measured in step S202 in a storage device (not illustrated) as signal amplitude information 1. The storage device in which the signal amplitude information 1 is stored here may be built into the electronic device 1C or the signal transmission device 2C, or may be connected to the electronic device 1C or the signal transmission device 2C via a signal line (not illustrated).

Next, in step S205, in the signal transmission system 100C, the communication control unit 110 of the electronic device 1C switches a signal transmission rate of the communication signals from the signal transmission rate T1 in a usual time to the low signal transmission rate T2. As a result, a transmission mode transitions to a second transmission mode that is a test low-rate signal transmission mode for transmitting communication signals from the electronic device 1C on the power supplying side to the signal transmission device 2C on the power distribution side.

In step S206, in the signal transmission system 100C, the communication unit 21C on the signal transmission device 2C side including the power supply unit 22 operating as a power distribution circuit that distributes the power supply current Id supplied from the electronic device 1C receives the communication signals transmitted from the electronic device 1C at the signal transmission rate T2, and the reception processing unit 210 measures an amplitude of the received signals. Hereinafter, the amplitude of the received signals measured in step S205 will be referred to as "signal amplitude 2".

In step S207, the signal transmission system 100C stores information regarding the signal amplitude 2 measured in step S206 in a storage device (not illustrated) as signal amplitude information 2. The storage device in which the signal amplitude information 2 is stored here may be the same as or different from the storage device in which the signal amplitude information 1 is stored in step S204.

In step S208, the signal transmission system 100C reads the signal amplitude information 1 and the signal amplitude information 2 stored in the storage device in steps S204 and S207, respectively, and compares the signal amplitude 1 with the signal amplitude 2 on the basis of such information. As a result, in a case where the signal amplitude 1 is larger, the process proceeds to step S209, and otherwise, that is, in a case where the signal amplitude 2 is larger, the process proceeds to step S210. The processes in and after step S208 may be performed by either the filter state determination unit 170 of the electronic device 1C or the filter state determination unit 270 of the signal transmission device 2C.

In step S209, the signal transmission system 100C specifies the filter circuit 13 on the electronic device 1C side having the power supply unit 12 operating as a power supplying circuit that supplies the power supply current Id to the signal transmission device 2C as an occurrence location of the short-circuit failure. Information indicating the specified occurrence location of the short-circuit failure is stored in the storage device, and the process proceeds to step S211.

In step S210, the signal transmission system 100C specifies the filter circuit 23 on the side of the signal transmission device 2C having the power supply unit 22 operating as a power distribution circuit that distributes the power supply current Id supplied from the electronic device 1C as an occurrence location of the short-circuit failure. Information indicating the specified occurrence location of the short-circuit failure is stored in the storage device, and the process proceeds to step S211.

In step S211, the signal transmission system 100C provides a notification of an alarm indicating that the short-circuit failure occurs in the PoDL filter and the failure occurrence location on the basis of the information stored in the storage device in step S209 or S210. The notification may be provided to a user of the signal transmission system 100 or a host system on which the signal transmission system 100 is mounted according to any method such as outputting a predetermined sound or image.

In a case where the notification of the alarm and the failure location is provided in step S211 or it is determined in step S203 that the signal amplitude 1 has not decreased to about 50% of the amplitude at the normal time, the test mode illustrated in the flowchart of FIG. 10 is ended.

According to the sixth embodiment of the present invention described above, the electronic device 1C and the signal transmission device 2C can bidirectionally communicate with each other. In the first transmission mode in which the communication signals are transmitted from the signal transmission device 2C to the electronic device 1C (step S201), the communication unit 11C receives the communication signals transmitted at the signal transmission rate T2 from the communication unit 21C via the differential wiring 5, and an amplitude of the received communication signals is measured by the reception processing unit 112 (step S202). In the second transmission mode in which the communication signals are transmitted from the electronic device 1C to the signal transmission device 2C (step S205), the communication unit 21C receives the communication signals transmitted at the signal transmission rate T2 from the communication unit 11C via the differential wiring 5, and the amplitude of the received communication signals is measured by the reception processing unit 210 (step S206). The signal processing unit 17 of the electronic device 1C or the signal processing unit 27 of the signal transmission device 2C causes the filter state determination unit 170 or 270 to compare the amplitudes measured by the communication unit 11C and the communication unit 21C with each other (step S208), and specifies which of the filter circuit 13 and the filter circuit 23 has a short-circuit failure on the basis of the comparison result (steps S209 and S210). With this configuration, it is possible to reliably specify which of the filter circuits 13 and 23 has a short-circuit failure.

Seventh Embodiment

Next, a seventh embodiment of the present invention will be described. In the present embodiment, an example of a procedure of performing a test mode for detecting a short-circuit failure of a PoDL filter in various checks performed when the signal transmission system 100 is mounted on an automobile and the automobile is started will be described. In the present embodiment, an example of a case where the test mode is performed in the signal transmission system 100 described in the first embodiment will be described. However, also in a case where the test mode is performed in the signal transmission system 100A described in the second embodiment, the signal transmission system 100B described in the fourth embodiment, or the signal transmission system 100C described in the fifth embodiment, the test mode may be performed in a similar procedure.

Figure 11:
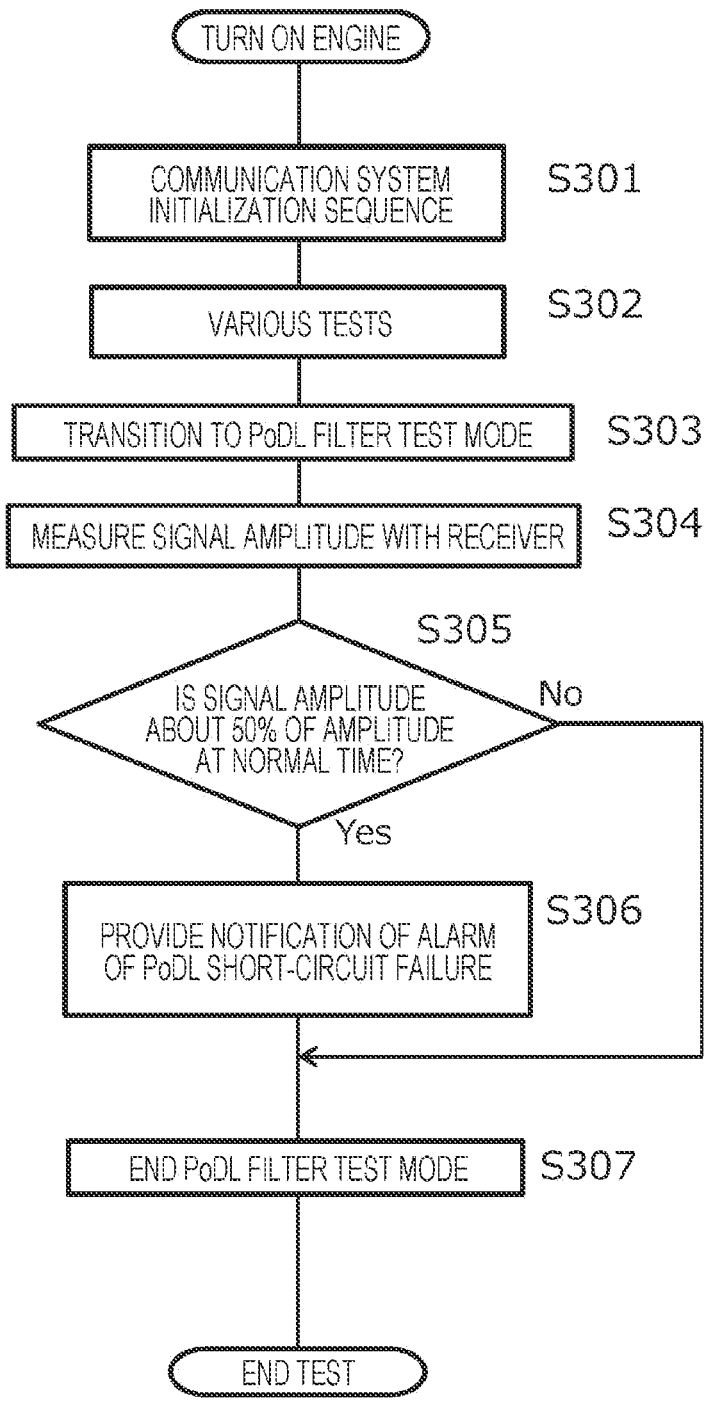
FIG. 11 is a flowchart illustrating a procedure of a test mode according to a seventh embodiment of the present invention.

FIG. 11 is a flowchart illustrating a procedure of a test mode according to the seventh embodiment of the present invention. In an automobile equipped with the signal transmission system 100, in a case where the automobile is started by turning on an engine or the like, power is supplied to various electric and electronic devices in the automobile to perform initialization. In this case, in a case where an initialization sequence for an electronic device of the communication system including the signal transmission system 100 is performed in step S301, the signal transmission system 100 performs various tests in step S302, and then transitions to the test mode for the PoDL filter in step S303. As described above, the initialization sequence of the signal transmission system 100 performed at the time of starting of the automobile includes various tests, and the test mode for detecting a short-circuit failure of the PoDL filter is also performed as one of the various tests.

In step S303, the signal transmission system 100 transitions the test low-rate signal transmission mode by the communication control unit 110 of the electronic device 1 switching a signal transmission rate of the communication signals from the signal transmission rate T1 in a usual time to the low signal transmission rate T2.

Next, in step S304, in the signal transmission system 100, the communication unit 21 of the signal transmission device 2 receives the communication signals transmitted from the electronic device 1 at the signal transmission rate T2, and the reception processing unit 210 measures an amplitude of the received signals.

In step S305, the signal transmission system 100 causes the filter state determination unit 270 of the signal transmission device 2 to compare the amplitude of the received signals measured in step S304 with the preset amplitude of the received signals at the normal time, and determines whether or not the measured amplitude of the received signals is about 50% of the amplitude at the normal time. As a result, in a case where it is determined that the measured amplitude of the received signals has decreased to about 50% of the amplitude at the normal time, an alarm notification indicating that either of the filter circuits 13 and 23 that are PoDL filters has a short-circuit failure is provided in step S306. The alarm notification of the short-circuit failure may be provided to a user such as a driver of the automobile according to any method such as outputting a predetermined sound or image.

In a case where the alarm notification is provided in step S306 or it is determined in step S305 that the measured amplitude of the received signal has not decreased to about 50% of the amplitude at the normal time, the test mode illustrated in the flowchart of FIG. 11 is ended.

In the above description, the procedure example of the test mode performed at the time of starting of the automobile has been described according to the procedure of the test mode described in the third embodiment. However, by performing the procedure of the test mode described in the sixth embodiment at the time of starting of the automobile, in a case where a short-circuit failure of the PoDL filter is detected, which device the short-circuit failure has occurred in may be specified. In that case, instead of steps S303 to S307 in FIG. 11, the processes in steps S201 to S211 in FIG. 10 may be performed.

According to the seventh embodiment of the present invention described above, the signal transmission system 100 is mounted on an automobile. In the electronic device 1, the communication unit 11 transmits communication signals at the signal transmission rate T2 in a case where the automobile is started. In the signal transmission device 2, in a case where the communication signals are transmitted from the communication unit 11 at the signal transmission rate T2, the differential reception circuit 211 and the reception processing unit 210 of the communication unit 21 receive the communication signals and measure an amplitude thereof. The signal processing unit 27 causes the filter state determination unit 270 to detect a short-circuit failure of the filter circuit 13 or the filter circuit 23 on the basis of the amplitude measured by the communication unit 21. With this configuration, in the signal transmission system 100 mounted on the automobile, a short-circuit failure of the filter circuits 13 and 23 can be detected at an appropriate timing.

Eighth Embodiment

Next, an eighth embodiment of the present invention will be described. In the present embodiment, an example of a procedure in which the signal transmission system 100 is mounted on an automobile and the test mode is performed to detect a short-circuit failure of a PoDL filter occurring during driving of the automobile will be described. Also in the present embodiment, an example of a case where the test mode is performed in the signal transmission system 100 described in the first embodiment will be described similarly to the above-described seventh embodiment. However, also in a case where the test mode is performed in the signal transmission system 100A described in the second embodiment, the signal transmission system 100B described in the fourth embodiment, or the signal transmission system 100C described in the fifth embodiment, the test mode may be performed in a similar procedure.

Figure 12:
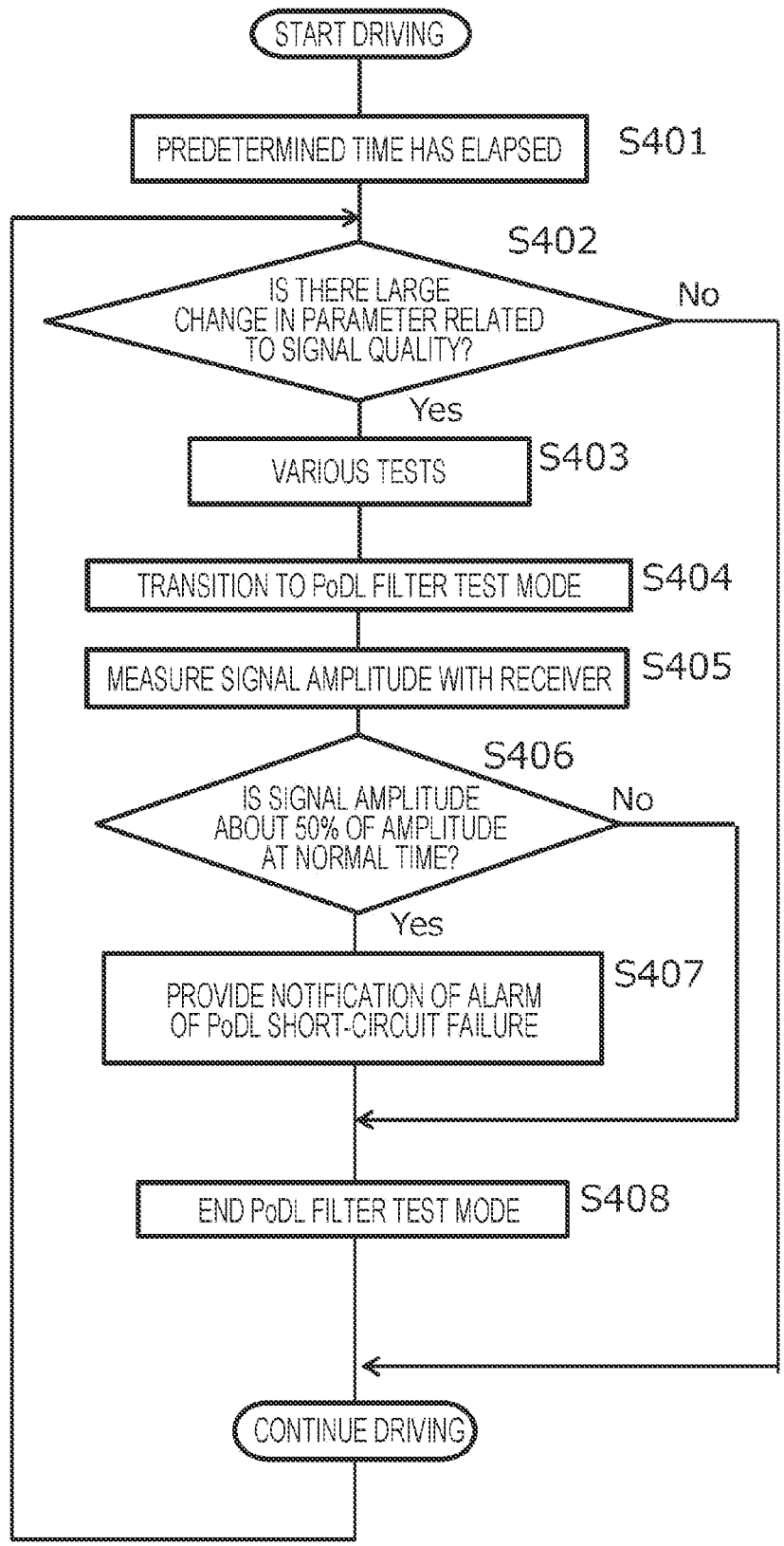
FIG. 12 is a flowchart illustrating a procedure of a test mode according to an eighth embodiment of the present invention.

FIG. 12 is a flowchart illustrating a procedure of a test mode according to the eighth embodiment of the present invention. In a case where it is determined in step S401 that a certain period of time has elapsed since the start of driving of the automobile on which the signal transmission system 100 is mounted, the signal transmission system 100 determines in step S402 whether there is a large change in a parameter related to the signal quality. The parameter related to the signal quality here is, for example, a large change in the number of errors of a cyclic redundancy check (CRC) or an equalizer setting value. As a result, in a case where it is determined that a large change in the parameter related to the signal quality has occurred, various tests are performed in step S403, and then a mode transitions to the test mode for the PoDL filter in step S404. As described above, in a case where the quality of the communication signals changes during driving of the automobile, various tests of the communication system are performed, and the test mode for detecting a short-circuit failure of the PoDL filter is also performed as one of these various tests.

In step S404, the signal transmission system 100 transitions to the test low-rate signal transmission mode by the communication control unit 110 of the electronic device 1 switching a signal transmission rate of the communication signals from the signal transmission rate T1 in a usual time to the low signal transmission rate T2.

Next, in step S405, in the signal transmission system 100, the communication unit 21 of the signal transmission device 2 receives the communication signals transmitted from the electronic device 1 at the signal transmission rate T2, and the reception processing unit 210 measures an amplitude of the received signals.

In step S406, the signal transmission system 100 causes the filter state determination unit 270 of the signal transmission device 2 to compare the amplitude of the received signals measured in step S405 with the preset amplitude of the received signals at the normal time, and determines whether or not the measured amplitude of the received signals is about 50% of the amplitude at the normal time. As a result, in a case where it is determined that the measured amplitude of the received signals has decreased to about 50% of the amplitude at the normal time, an alarm notification indicating that either of the filter circuits 13 and 23 that are PoDL filters has a short-circuit failure is provided in step S407. The alarm notification of the short-circuit failure may be provided to a user such as a driver of the automobile according to any method such as outputting a predetermined sound or image.

In a case where the alarm notification is provided in step S407 or it is determined in step S406 that the measured amplitude of the received signals has not decreased to about 50% of the amplitude at the normal time, the test mode for detecting a short-circuit failure of the PoDL filter is ended in step S408. If the driving of the automobile is continued thereafter, the process returns to step S402 to continue the test mode.

In the above description, the procedure example of the test mode performed at the time of starting of the automobile has been described according to the procedure of the test mode described in the third embodiment. However, by performing the procedure of the test mode described in the sixth embodiment at the time of starting of the automobile, in a case where a short-circuit failure of the PoDL filter is detected, which device the short-circuit failure has occurred in may be specified. In that case, instead of steps S404 to S408 in FIG. 12, the processes in steps S201 to S211 in FIG. 10 may be performed.

According to the eighth embodiment of the present invention described above, the signal transmission system 100 is mounted on an automobile. In the electronic device 1, in a case where an abnormality occurs in communication signals while the automobile is traveling, the communication unit 11 switches a transmission rate from the signal transmission rate T1 to the signal transmission rate T2 and transmits the communication signals. In the signal transmission device 2, in a case where the communication signals are transmitted from the communication unit 11 at the signal transmission rate T2, the differential reception circuit 211 and the reception processing unit 210 of the communication unit 21 receive the communication signals and measure an amplitude thereof. The signal processing unit 27 causes the filter state determination unit 270 to detect a short-circuit failure of the filter circuit 13 or the filter circuit 23 on the basis of the amplitude measured by the communication unit 21. With this configuration, in the signal transmission system 100 mounted on the automobile, in a case where an abnormality occurs in the communication signals, a short-circuit failure of the filter circuits 13 and 23 can be detected at an appropriate timing.

Ninth Embodiment

Next, a ninth embodiment of the present invention will be described. In the present embodiment, a connection structure of a power supply unit that reduces the influence on communication signal quality in a case where a short-circuit failure of a PoDL filter occurs will be described.

Figure 13:
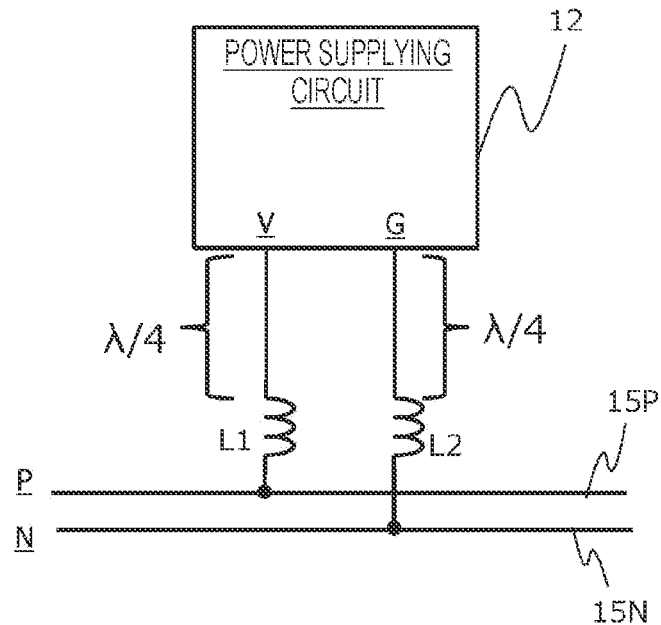
FIG. 13 is a diagram illustrating a connection structure of a power supply unit according to a ninth embodiment of the present invention.

FIG. 13 is a diagram illustrating a connection structure of the power supply unit 12 according to the ninth embodiment of the present invention. In the present embodiment, in the signal transmission system 100 described in the first embodiment, a wiring between the power supply unit 12 that is a power supplying circuit provided in the electronic device 1 and the inductors L1 and L2 of the filter circuit 13 is adjusted to a length of ¼ of a wavelength λ of the communication signals as illustrated in FIG. 13. As a result, in a case where a short-circuit failure occurs in the inductors L1 and L2 of the filter circuit 13, the wiring portion connected to the inductors can function as an open stub filter. Since the open stub filter functions as a band-stop filter, there is an effect of filtering disturbance superimposed on the wiring on the short-circuit failure occurrence side out of the signal wirings 15P and 15N to improve the quality of the communication signals. In this case, the effect of the open stub filter as described above can be further enhanced by sufficiently increasing impedance of the power supply unit 12 in the high frequency region at the signal transmission rate in a usual time.

Tenth Embodiment

Next, a signal transmission system according to a tenth embodiment of the present invention will be described. In the present embodiment, a communication method in a case where a short-circuit failure occurs in a PoDL filter of any electronic device in a signal transmission system in which a plurality of electronic devices can communicate with each other will be described.

Figure 14:
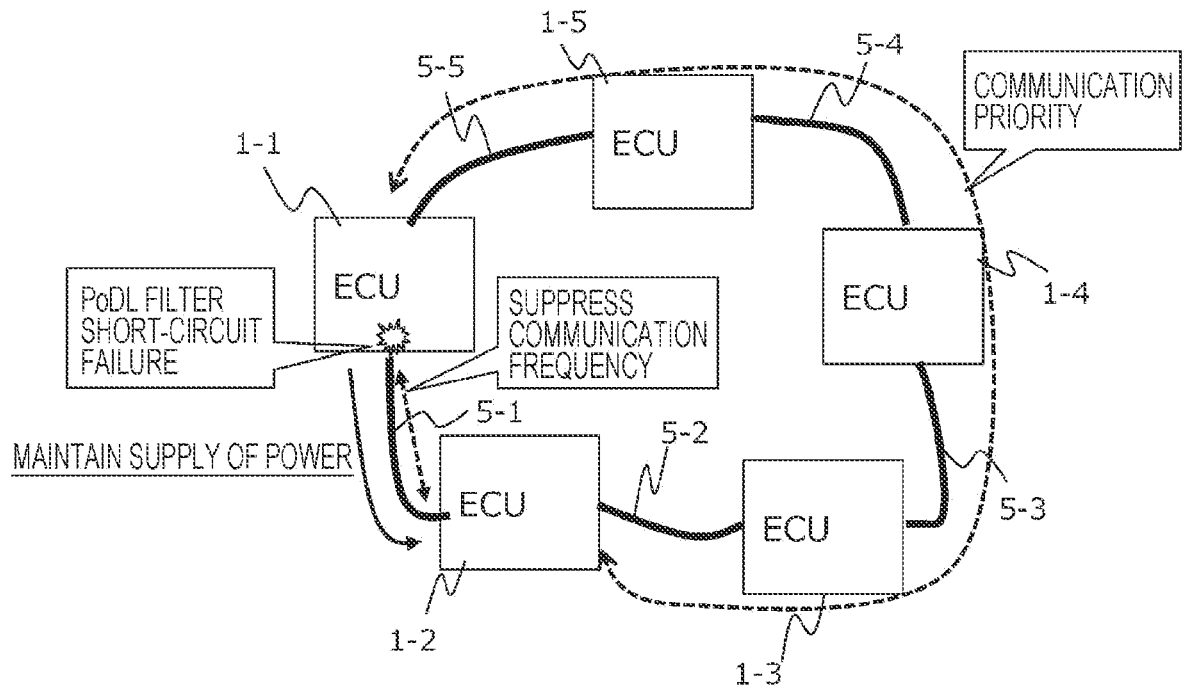
FIG. 14 is a diagram illustrating a configuration of a signal transmission system according to a tenth embodiment of the present invention.

FIG. 14 is a diagram illustrating a configuration of a signal transmission system 100D according to the tenth embodiment of the present invention. The signal transmission system 100D illustrated in FIG. 14 is mounted on an automobile, and ECUs 1-1 to 1-5 that are electronic control devices are connected to each other via differential wirings 5-1 to 5-5 to form a network of a ring-type topology. The ECUs 1-1 to 1-5 have the same configuration as that of the electronic devices 1 to 1C or the signal transmission devices 2 to 2C described in the above-described respective embodiments, and can perform communication and the supply of power with each other via the differential wirings 5-1 to 5-5. The ECUs respectively have PoDL filters built thereinto, and in a case where a short-circuit failure occurs in the PoDL filter, the short-circuit failure can be detected.

In a network such as the signal transmission system 100D, in a case where a short-circuit failure of the PoDL filter occurs in any of the ECUs, although communication signals deteriorate during signal transmission in a communication path including the filter, there is a possibility that communication can be continuously performed. However, since communication signals are transmitted in a single-ended manner in a signal system in which the communication signals should originally be transmitted differentially, a problem may occur from the viewpoint of electromagnetic compatibility (EMC). That is, a common mode current becomes large due to the short-circuit failure of the PoDL filter, and electromagnetic noise caused by the common mode current is generated in the in-vehicle system including the signal transmission system 100D, so that there is a possibility that another device mounted on the automobile malfunctions. Therefore, in a case where information indicating that the short-circuit failure of the PoDL filter has occurred is detected in the signal transmission system 100D, the signal transmission system 100D preferably transitions to a control mode in which the frequency of communication via a corresponding communication path is suppressed such that the energy density of the generated electromagnetic noise does not increase.

In the signal transmission system 100D of the present embodiment, as described above, in a case where it is detected that a short-circuit failure of the PoDL filter has occurred in any of the ECUs 1-1 to 1-5, control is performed to suppress the frequency of communication via the communication path including the filter. For example, as illustrated in FIG. 14, it is assumed that a short-circuit failure of the PoDL filter connected to the differential wiring 5-1 between the ECU 1-1 and the ECU 1-2 is detected in the ECU 1-1. In this case, between the ECU 1-1 and the ECU 1-2, while the supply of power via the differential wiring 5-1 is maintained, the communication frequency of the communication path including the differential wiring 5-1 is suppressed, and communication is performed by preferentially using the communication path passing through the differential wirings 5-2 to 5-5 without passing through the differential wiring 5-1. As a result, although the penalty of the communication delay is generated, it is possible to continuously operate the in-vehicle system while reducing the malfunction risk due to the noise of the entire in-vehicle system. The above-described control may be performed by either the ECU 1-1 or the ECU 1-2, or may be performed by another ECU.

According to the tenth embodiment of the present invention described above, in the signal transmission system 100D, the ECU 1-1 and the ECU 1-2 can communicate with each other via the communication path including the differential wiring 5-1 and the communication path not including the differential wiring 5-1. In a case where a short-circuit failure of the PoDL filter is detected, the communication unit included in each of the ECU 1-1 and the ECU 1-2 transmits and receives communication signals by preferentially using the communication path not including the differential wiring 5-1 over the communication path including the differential wiring 5-1. With this configuration, it is possible to suppress the occurrence of electromagnetic noise in a case where the PoDL filter fails and to avoid malfunctions of other devices.

Eleventh Embodiment

Next, a signal transmission system according to an eleventh embodiment of the present invention will be described. In the present embodiment, a method for issuing a warning to a driver of an automobile in a case where a short-circuit failure of a PoDL filter occurs in a signal transmission system mounted on the automobile will be described.

Figure 15:
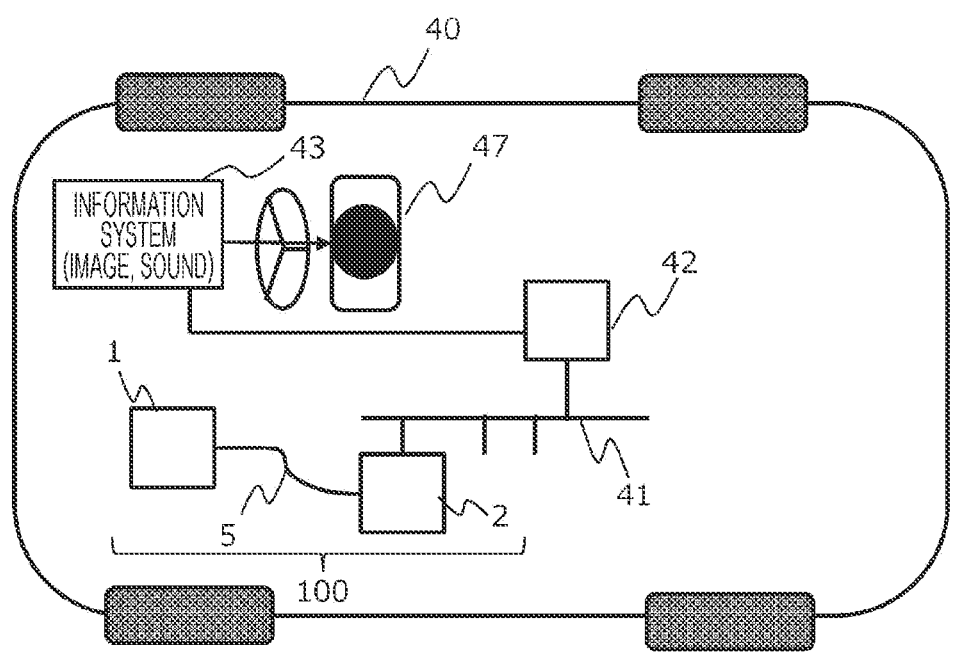
FIG. 15 is a diagram illustrating a configuration of an in-vehicle system including a signal transmission system according to an eleventh embodiment of the present invention.

FIG. 15 is a diagram illustrating a configuration of an in-vehicle system including a signal transmission system according to an eleventh embodiment of the present invention. The in-vehicle system illustrated in FIG. 15 is mounted on an automobile 40 and includes the signal transmission system 100 described in the first embodiment. In the signal transmission system 100, the signal transmission device 2 is connected to an in-vehicle network 41 such as the Controller Area Network (CAN).

In the signal transmission system 100, in a case where a short-circuit failure of either of the filter circuits 13 and 23 that are PoDL filters of the electronic device 1 or the signal transmission device 2 is detected, the signal transmission device 2 transmits failure information to a gateway 42 connected via the in-vehicle network 41. This failure information is transmitted from the gateway 42 to a user interface unit 43 provided in the automobile 40. The user interface unit 43 is an information processing device that issues a predetermined warning to a driver 47 boarding the automobile 40 by using an image, an alarm sound, a voice, or the like on the basis of the failure information transmitted from the signal transmission device 2 via the gateway 42. As a result, it is possible to notify the driver 47 that a short-circuit failure has occurred in the PoDL filter in the signal transmission system 100 and prompt the driver 47 to make a determination such as switching to a safe driving mode.

In the present embodiment, the example of the in-vehicle system including the signal transmission system 100 described in the first embodiment has been described. However, a similar process to that of the present embodiment can be performed in an in-vehicle system including the signal transmission system 100A described in the second embodiment, the signal transmission system 100B described in the fourth embodiment, the signal transmission system 100C described in the fifth embodiment, or the signal transmission system 100D described in the tenth embodiment. The failure information may be output from the signal transmission device 2 to the user interface unit 43 via the in-vehicle network 41 without using gateway 42. In any case, when a short-circuit failure of the PoDL filter occurs in the signal transmission system, failure information for issuing a warning to the driver 47 may be output from the device in the signal transmission system to the user interface unit 43.

According to the eleventh embodiment of the present invention described above, the signal transmission system 100 is mounted on the automobile 40 including the in-vehicle network 41 and the user interface unit 43 that is connected to the in-vehicle network 41 via the gateway 42 and controls a warning to the driver 47. In a case where a short-circuit failure of the PoDL filter is detected, the signal transmission device 2 transmits failure information for issuing a predetermined warning to the driver 47 to the user interface unit 43 via the in-vehicle network 41. With this configuration, in a case where a failure has occurred in a PoDL filter in the signal transmission system 100, it is possible to immediately notify the driver 47 of the failure.

Twelfth Embodiment

Next, a signal transmission system according to a twelfth embodiment of the present invention will be described. In the present embodiment, a notification method in a case where a short-circuit failure of s PoDL filter occurs at the time of vehicle inspection in a signal transmission system mounted on an automobile will be described.

Figure 16:
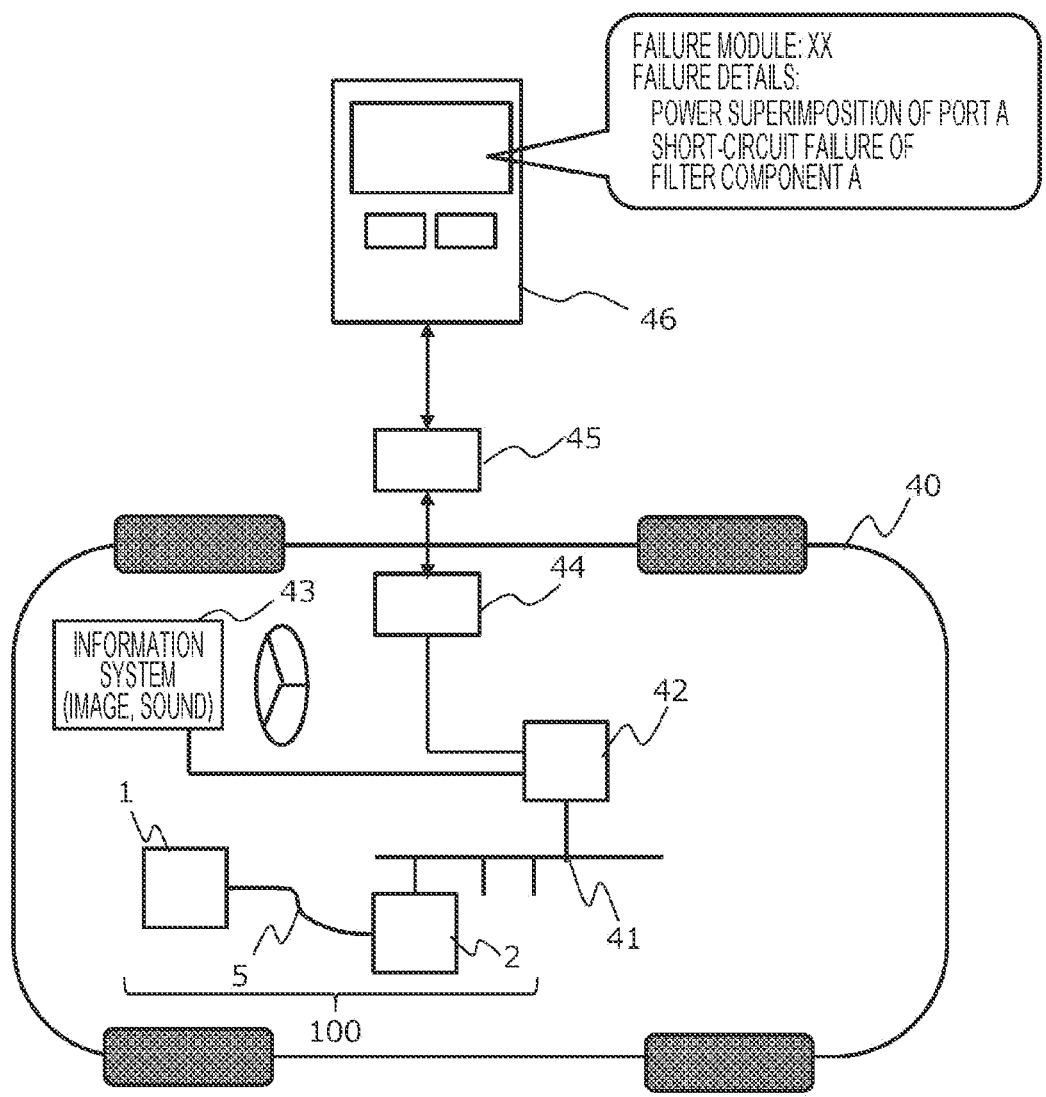
FIG. 16 is a diagram illustrating a configuration of an in-vehicle system including a signal transmission system according to a twelfth embodiment of the present invention.

FIG. 16 is a diagram illustrating a configuration of an in-vehicle system including a signal transmission system according to the twelfth embodiment of the present invention. The in-vehicle system illustrated in FIG. 16 is mounted on an automobile 40 and includes the signal transmission system 100 described in the first embodiment. In the signal transmission system 100, the signal transmission device 2 is connected to the in-vehicle network 41 such as CAN in the same manner as described in the eleventh embodiment.

When inspection of the automobile 40 is performed, the failure diagnosis device 46 is connected to a communication port 44 for an inspection signal provided in the automobile 40 via a relay device 45. In the signal transmission system 100, in a case where a short-circuit failure of either of the filter circuits 13 and 23 that are PoDL filters of the electronic device 1 or the signal transmission device 2 is detected, the signal transmission device 2 transmits failure information to a gateway 42 connected via the in-vehicle network 41. This failure information is transmitted from the gateway 42 to the failure diagnosis device 46 via the communication port 44 and the relay device 45 in a predetermined signal format such as OBD2. The failure diagnosis device 46 displays a screen indicating that the short-circuit failure has occurred in the filter circuits 13 and 23 on the basis of the failure information transmitted from the signal transmission device 2 via the gateway 42. As a result, an inspector carrying the failure diagnosis device 46 can easily ascertain that the short-circuit failure has occurred in the PoDL filter in the signal transmission system 100. As a result, it is possible to minimize work processes and replacement parts at the time of failure repair, and thus it is possible to reduce the cost.

In the present embodiment, the example of the in-vehicle system including the signal transmission system 100 described in the first embodiment has been described. However, a similar process to that of the present embodiment can be performed in an in-vehicle system including the signal transmission system 100A described in the second embodiment, the signal transmission system 100B described in the fourth embodiment, the signal transmission system 100C described in the fifth embodiment, or the signal transmission system 100D described in the tenth embodiment. The failure information may be output from the signal transmission device 2 to the failure diagnosis device 46 connected to the communication port 44 via the in-vehicle network 41 without using the gateway 42 or the relay device 45. In any case, when a short-circuit failure of the PoDL filter occurs in the signal transmission system, failure information regarding the short-circuit failure can be transmitted from the device in the signal transmission system to the failure diagnosis device 46 connected to the communication port 44.

According to the twelfth embodiment of the present invention described above, the signal transmission system 100 is mounted on the automobile 40 including the in-vehicle network 41 and the communication port 44 for connecting the in-vehicle network 41 to the external failure diagnosis device 46. In a case where a short-circuit failure of the PoDL filter is detected, the signal transmission device 2 transmits failure information regarding the short-circuit failure to the failure diagnosis device 46 connected to the communication port 44 via the in-vehicle network 41. With this configuration, in a case where a failure occurs in the PoDL filter in the signal transmission system 100, it is possible to notify an inspector of the failure at the time of inspecting the automobile 40.

Thirteenth Embodiment

Next, a signal transmission system according to a thirteenth embodiment of the present invention will be described. In the present embodiment, a method of providing repair recommendation information to a user of an automobile in a case where a short-circuit failure of a PoDL filter occurs in a signal transmission system mounted on the automobile operated as a connected car will be described.

Figure 17:
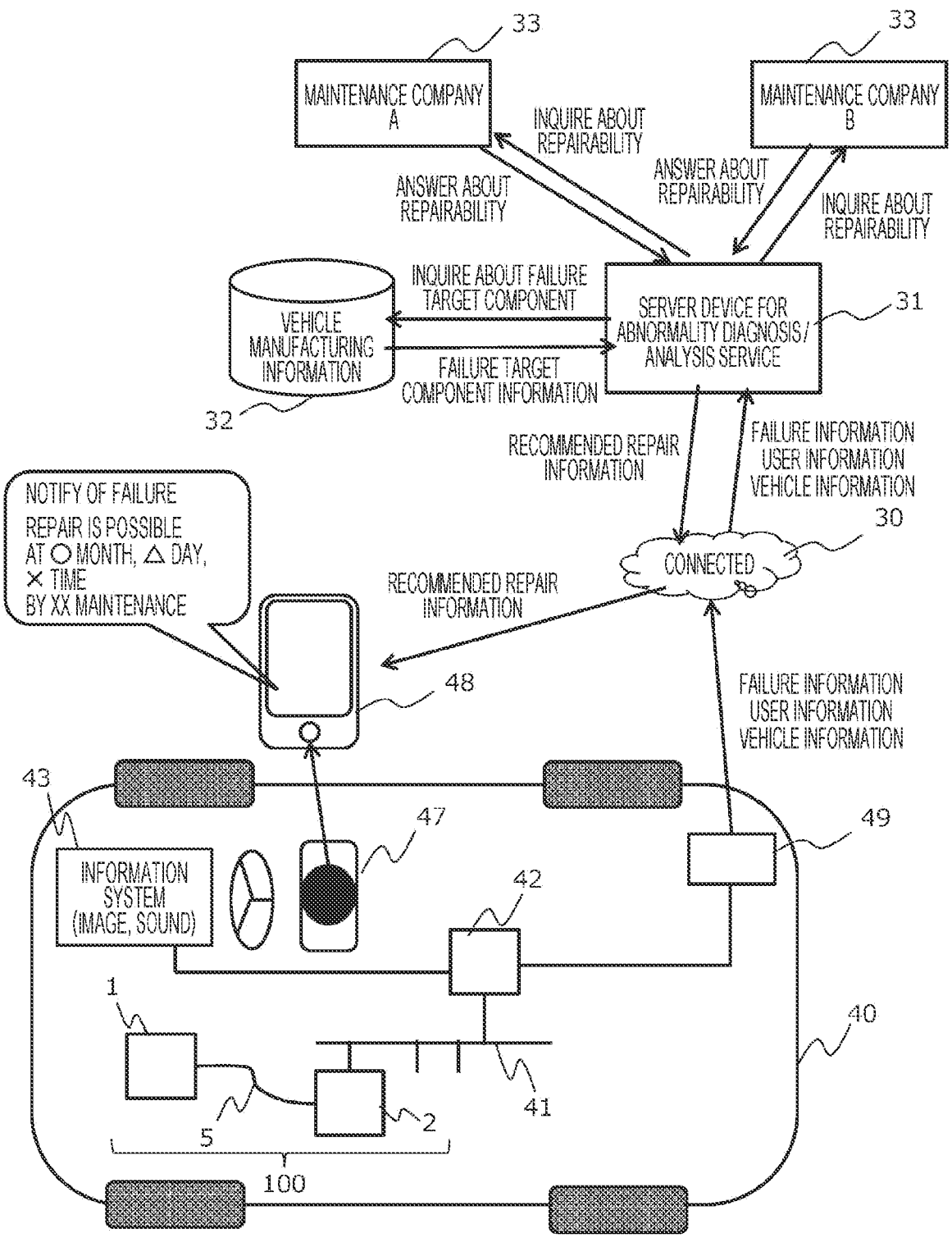
FIG. 17 is a diagram illustrating a configuration of an information provision system according to a thirteenth embodiment of the present invention.

FIG. 17 is a diagram illustrating a configuration of an information provision system according to the thirteenth embodiment of the present invention. The information provision system illustrated in FIG. 17 is mounted on an automobile 40, and includes an in-vehicle system including the signal transmission system 100 described in the first embodiment, and a server device 31 that provides an abnormality diagnosis/analysis service. In the signal transmission system 100, the signal transmission device 2 is connected to the in-vehicle network 41 such as CAN in the same manner as described in the eleventh embodiment.

In the signal transmission system 100, in a case where a short-circuit failure of either of the filter circuits 13 and 23 that are PoDL filters of the electronic device 1 or the signal transmission device 2 is detected, the signal transmission device 2 transmits failure information to a gateway 42 connected via the in-vehicle network 41. This failure information is transmitted from the gateway 42 to a communication unit 49 provided in the automobile 40. The communication unit 49 is a communication device that performs wireless communication, and transmits the failure information together with user information or vehicle information of the automobile 40 to the server device 31 connected via a cloud 30.

The server device 31 is installed in a location different from that of the automobile 40, and makes an inquiry about the filter circuits 13 and 23 that are failure target components, to a vehicle manufacturing information database 32 on the basis of the failure information and the vehicle information transmitted from the signal transmission device 2 via the gateway 42, the communication unit 49, and the cloud 30. In the vehicle manufacturing information database 32, databases related to various components are registered in advance for each vehicle type, information regarding a failure target component is retrieved in response to the inquiry from the server device 31, and a retrieval result is transmitted to the server device 31. As a result, the server device 31 can acquire failure target component information related to the filter circuits 13 and 23 having a short-circuit failure in the signal transmission system 100 mounted on the automobile 40.

After the failure target component information is acquired from the vehicle manufacturing information database 32, the server device 31 inquires of a maintenance company 33 that repairs the automobile 40 about whether to repair the failure target component on the basis of the acquired failure target component information. In FIG. 17, there are two maintenance companies A and B as the maintenance companies 33, and an example in which an inquiry as to whether or not repair is possible is made to each thereof is illustrated, but the number of maintenance companies 33 to which the inquiry is made is not limited thereto. Each maintenance company 33 to which the inquiry is made from the server device 31 transmits information such as repairability, a repairable time, and a repair amount to the server device 31 to answer the inquiry.

In a case where the answer is acquired from each maintenance company 33, the server device 31 generates recommended repair information regarding repair of a short-circuit failure occurring in the filter circuits 13 and 23 on the basis of the acquired answer, and transmits the recommended repair information to an information terminal 48 such as a smartphone possessed by the user of the automobile 40 via the cloud 30. The recommended repair information includes information regarding the maintenance company 33 that can perform repair, and information such as a repairable time and a repair amount. The information terminal 48 displays the received recommended repair information on a screen and provides the user with the recommended repair information. As a result, in a case where a short-circuit failure occurs in the PoDL filter in the signal transmission system 100, the user of the automobile 40 can easily obtain useful information regarding the subsequent maintenance. By receiving an inquiry about repairability from the server device 31 in advance, each maintenance company 33 can respond to a failure in a planned manner.

In the present embodiment, the example of the in-vehicle system including the signal transmission system 100 described in the first embodiment has been described. However, a similar process to that of the present embodiment can be performed in an in-vehicle system including the signal transmission system 100A described in the second embodiment, the signal transmission system 100B described in the fourth embodiment, the signal transmission system 100C described in the fifth embodiment, or the signal transmission system 100D described in the tenth embodiment. Although FIG. 17 illustrates an example in which the recommended repair information is transmitted from the server device 31 to the information terminal 48 to provide the recommended repair information to the user, the recommended repair information may be provided to the user by transmitting the recommended repair information from the server device 31 to the communication unit 49 and displaying the recommended repair information on the user interface unit 43 connected via the gateway 42. In any case, when a short-circuit failure occurs in the PoDL filter in the signal transmission system, information regarding repair of the short-circuit failure can be provided to the user of the automobile 40 by using the server device 31.

According to the thirteenth embodiment of the present invention described above, the signal transmission system 100 is mounted on the automobile including the in-vehicle network 41 and the communication unit 49 that is a communication device connected to the in-vehicle network 41 via the gateway 42 to perform wireless communication. In a case where the signal processing unit 27 of the signal transmission device 2 detects a short-circuit failure of the PoDL filter, failure information regarding the short-circuit failure is transmitted from the signal transmission device 2 to the communication unit 49 via the in-vehicle network 41. The failure information is transmitted to the server device 31 installed in a location different from that of the automobile 40 by wireless communication performed by the communication unit 49, and the failure target component information regarding the filter circuit 13 or the filter circuit 23 corresponding to the PoDL filter in which the short-circuit failure has occurred is acquired by the server device 31 by using the vehicle manufacturing information database 32 registered in advance. Thereafter, on the basis of the acquired failure target component information, the server device 31 makes an inquiry about whether or not repair is possible to the maintenance company 33 that repairs the automobile 40, and the server device 31 transmits the recommended repair information based on a result of the inquiry. Information regarding the repair of the short-circuit failure is provided to the user of the automobile on the basis of the recommended repair information transmitted from the server device 31 as described above. With this configuration, in a case where a failure occurs in the PoDL filter in the signal transmission system 100, it is possible to provide the user with useful information regarding the subsequent maintenance and improve the usability of the automobile 40 on which the signal transmission system 100 is mounted.

Fourteenth Embodiment

Next, a signal transmission system according to a fourteenth embodiment of the present invention will be described. In the present embodiment, a method of providing statistical information of failures to a manufacturer and a seller of an automobile on the basis of an occurrence history of a short-circuit failure of a PoDL filter in a signal transmission system mounted on the automobile operated as a connected car will be described.

Figure 18:
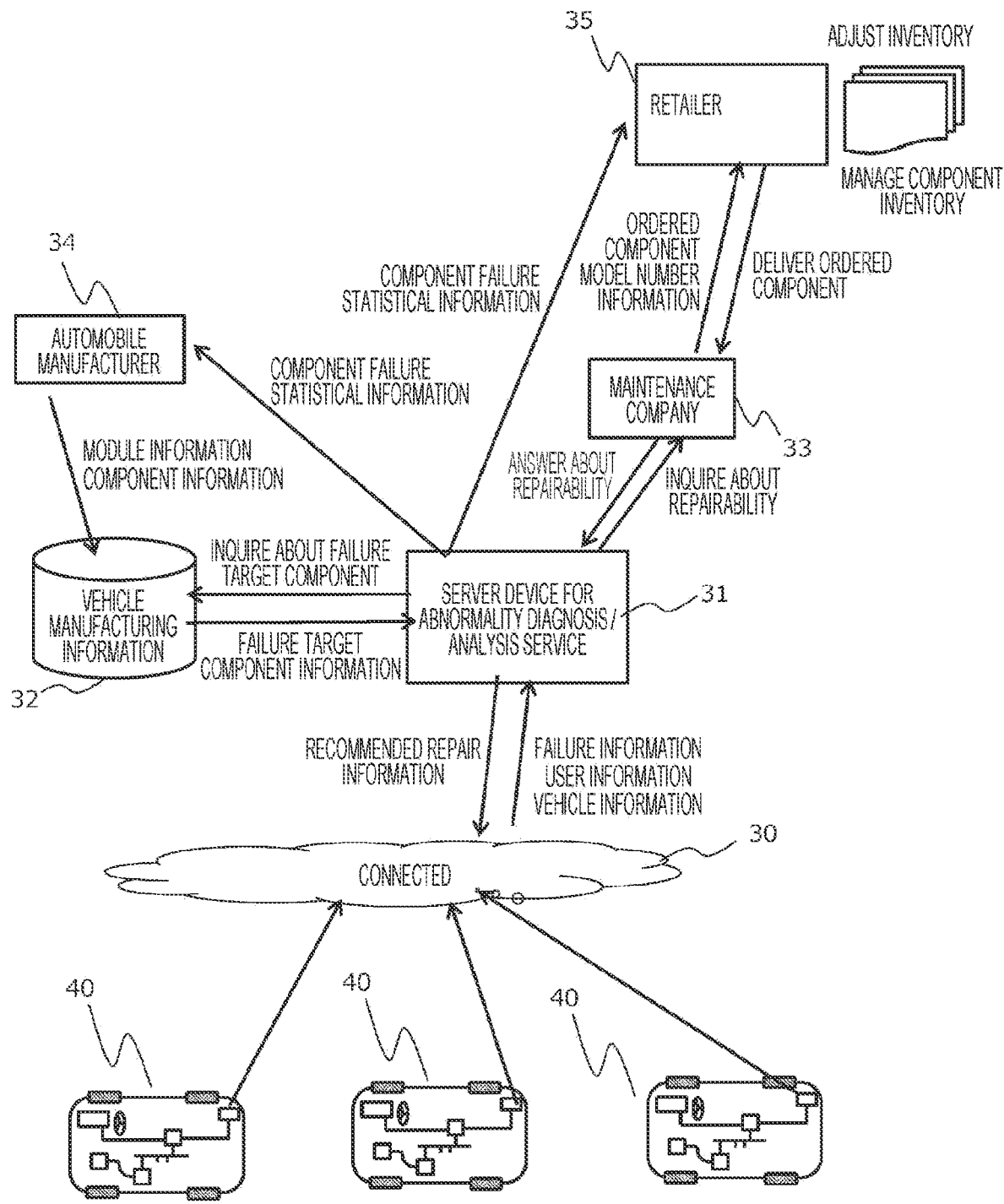
FIG. 18 is a diagram illustrating a configuration of an information provision system according to a fourteenth embodiment of the present invention.

FIG. 18 is a diagram illustrating a configuration of an information provision system according to a fourteenth embodiment of the present invention. The information provision system illustrated in FIG. 18 includes a plurality of automobiles 40 and a server device 31 that provides an abnormality diagnosis/analysis service. Similarly to the information provision system in FIG. 17 described in the thirteenth embodiment, each automobile 40 is equipped with an in-vehicle system including the signal transmission system 100 described in the first embodiment.

In the information provision system of the present embodiment, processing similar to that described in the thirteenth embodiment is performed between the in-vehicle system of each automobile 40 and the server device 31. That is, in a case where a short-circuit failure occurs in the PoDL filter in the signal transmission system in the in-vehicle system, failure information regarding the short-circuit failure is transmitted from each automobile 40 to the server device 31 via the cloud 30, and the server device 31 inquires of the maintenance company 33 about whether or not repair is possible. On the basis of an answer from the maintenance company 33, recommended repair information regarding repair of the short-circuit failure is generated in the server device 31, and is provided from the server device 31 to a user of each automobile 40 via the cloud 30.

In the information provision system of the present embodiment, the server device 31 collects failure information transmitted from each automobile 40 and performs statistical processing, and thus creates statistical information regarding a failure of the PoDL filter of the signal transmission system. The statistical information includes a difference in failure frequency from another component group having the same function, a failure occurrence frequency, distribution information of use time until failure, and the like. By utilizing the statistical information thus created, the server device 31 provides useful values to each of an automobile manufacturer 34 who manufactures the automobile 40 and a retailer 35 who sells the automobile 40. For example, the automobile manufacturer 34 can acquire information regarding a component having the same performance with a lower failure frequency from the statistical information provided from the server device 31, and can consider replacement with a more reliable component on the basis of the information. The retailer 35 can optimize the component inventory by acquiring information regarding the quantity and the failure frequency of target components on the market from the statistical information provided from the server device 31 and performing component inventory management on the basis of the information.

According to the fourteenth embodiment of the present invention described above, the server device 31 performs statistical processing on failure information received from each of the plurality of automobiles 40 to create statistical information regarding failures of the filter circuit 13 and the filter circuit 23. The statistical information created by the server device 31 is provided to the automobile manufacturer 34 or the retailer 35. With this configuration, it is possible to provide useful values to the automobile manufacturer 34 who manufactures the automobile 40 and the retailer 35 who sells the automobile 40.

Each embodiment and various modifications described above are merely examples, and the present invention is not limited to these contents as long as the features of the invention are not impaired. Although various embodiments and modifications have been described above, the present invention is not limited to these contents. Other aspects conceivable within the scope of the technical idea of the present invention are also included within the scope of the present invention.

REFERENCE SIGNS LIST 1, 1A, 1C, 1Z electronic device
2, 2A, 2B, 2C, 2Z signal transmission device
5 differential wiring
11, 11C, 11Z communication unit
12, 12A power supply unit
13 filter circuit
14N, 14P capacitor
15N, 15P signal wiring
16 connector
17 signal processing unit
21, 21C, 21Z communication unit
22, 22A power supply unit
23 filter circuit
24N, 24P capacitor
25N, 25P signal wiring
26 connector
27, 27Z signal processing unit
28 storage device
100, 100A, 100B, 100C, 100D, 100Z signal transmission system
110, 110Z communication control unit
111 differential transmission circuit
112 reception processing unit
113 differential reception circuit
114 waveform equivalent circuit
170 filter state determination unit
210, 210Z reception processing unit
211 differential reception circuit
212 waveform equivalent circuit
213 communication control unit
214 differential transmission circuit
270 filter state determination unit

The invention claimed is:

1. A signal transmission device connected to an electronic device via a differential wiring including a pair of electric wires, the signal transmission device comprising:
a communication unit that performs communication using differential transmission with the electronic device via the differential wiring; and
a signal processing unit that performs signal processing related to the communication, wherein
each of the electronic device and the signal transmission device includes a power supply unit that supplies a power supply current via the differential wiring, and a filter circuit electrically connected between the differential wiring and the power supply unit,
the communication unit is capable of receiving, via the differential wiring, communication signals transmitted from the electronic device at each of a plurality of signal transmission rates including at least a first signal transmission rate and a second signal transmission rate lower than the first signal transmission rate,
the communication unit measures an amplitude of the communication signals received from the electronic device at the second signal transmission rate, and
the signal processing unit detects a short-circuit failure of the filter circuit on the basis of the amplitude measured by the communication unit.

2. The signal transmission device according to claim 1, wherein
the power supply unit included in the electronic device applies a predetermined potential difference between the pair of electric wires to supply the power supply current to the signal transmission device, and
the power supply unit included in the signal transmission device distributes the power supply current supplied from the electronic device to the communication unit and the signal processing unit.

3. The signal transmission device according to claim 1, wherein the power supply unit included in the signal transmission device applies a predetermined potential difference between the pair of electric wires to supply the power supply current to the electronic device.

4. The signal transmission device according to claim 1, wherein
the communication unit has an equalizer function of adjusting waveforms of the communication signals within a predetermined effective frequency range to compensate for attenuation due to the differential wiring, and
the second signal transmission rate is a signal transmission rate at which a frequency of the communication signals is on a lower frequency side than the effective frequency range.

5. The signal transmission device according to claim 1, wherein the second signal transmission rate is a signal transmission rate at which a frequency of the communication signals is 1/20 or less of a fundamental frequency of the communication signals at the first signal transmission rate.

6. The signal transmission device according to claim 1, further comprising:
a storage device that stores amplitude information regarding an amplitude of the communication signals in a case where the filter circuit does not have a short-circuit failure, wherein
the signal processing unit detects a short-circuit failure of the filter circuit on the basis of the amplitude measured by the communication unit and the amplitude information stored in the storage device.

7. A signal transmission system comprising:
a first electronic device; and
a second electronic device connected to the first electronic device via a differential wiring including a pair of electric wires, wherein
the first electronic device includes
a pair of first signal wirings connected to the differential wiring,
a first communication unit that performs communication using differential transmission with the second electronic device via the first signal wirings and the differential wiring,
a first power supply unit that supplies a power supply current via the differential wiring, and
a first filter circuit that includes a pair of filter elements respectively connected between the pair of first signal wirings and the first power supply unit,
the second electronic device includes
a pair of second signal wirings connected to the differential wiring,
a second communication unit that performs communication with the first electronic device via the second signal wirings and the differential wiring,
a second signal processing unit that performs signal processing related to the communication,
a second power supply unit that supplies the power supply current via the differential wiring, and a second filter circuit that includes a pair of filter elements respectively connected between the pair of second signal wirings and the second power supply unit, the first communication unit transmits communication signals at each of a plurality of signal transmission rates including at least a first signal transmission rate and a second signal transmission rate lower than the first signal transmission rate, the second communication unit receives the communication signals transmitted from the first communication unit via the differential wiring and measures an amplitude of the communication signals received at the second signal transmission rate, and the second signal processing unit detects a short-circuit failure of the first filter circuit or the second filter circuit on the basis of the amplitude measured by the second communication unit.

8. The signal transmission system according to claim 7, wherein
the first power supply unit applies a predetermined potential difference between the pair of first signal wirings to supply the power supply current to the second electronic device, and
the second power supply unit distributes the power supply current supplied from the first power supply unit to the second communication unit and the second signal processing unit.

9. The signal transmission system according to claim 7, wherein
the second power supply unit applies a predetermined potential difference between the pair of second signal wirings to supply the power supply current to the first electronic device, and
the first power supply unit distributes the power supply current supplied from the second power supply unit to the first communication unit.

10. The signal transmission system according to claim 7, wherein
the first electronic device further includes a first signal processing unit that performs signal processing related to the communication,
the first communication unit and the second communication unit are capable of performing bidirectional communication with each other,
in a first transmission mode in which the communication signals are transmitted from the second electronic device to the first electronic device, the first communication unit receives the communication signals transmitted at the second signal transmission rate from the second communication unit via the differential wiring and measures the amplitude,
in a second transmission mode in which the communication signals are transmitted from the first electronic device to the second electronic device, the second communication unit receives the communication signals transmitted at the second signal transmission rate from the first communication unit via the differential wiring and measures the amplitude, and
the first signal processing unit or the second signal processing unit compares the amplitudes respectively measured by the first communication unit and the second communication unit with each other, and specifies which of the first filter circuit and the second filter circuit has a short-circuit failure on the basis of a comparison result.

11. The signal transmission system according to claim 7, wherein the signal transmission system is mounted on an automobile, and
the first communication unit transmits the communication signals at the second signal transmission rate in a case where the automobile is activated, and
the second communication unit receives the communication signals and measures the amplitude in a case where the communication signals are transmitted from the first communication unit at the second signal transmission rate, and
the second signal processing unit detects the short-circuit failure on the basis of the amplitude measured by the second communication unit.

12. The signal transmission system according to claim 7, wherein
the signal transmission system is mounted on an automobile,
the first communication unit switches from the first signal transmission rate to the second signal transmission rate and transmits the communication signals in a case where an abnormality occurs in the communication signals while the automobile is traveling,
the second communication unit receives the communication signals and measures the amplitude in a case where the communication signals are transmitted from the first communication unit at the second signal transmission rate, and
the second signal processing unit detects the short-circuit failure on the basis of the amplitude measured by the second communication unit.

13. The signal transmission system according to claim 7, wherein
the first electronic device and the second electronic device are capable of performing communication with each other via a first communication path including the differential wiring and a second communication path not including the differential wiring, and
the first communication unit and the second communication unit transmit and receive the communication signals by preferentially using the second communication path over the first communication path in a case where the short-circuit failure is detected by the second signal processing unit.

14. The signal transmission system according to claim 7, wherein
the signal transmission system is mounted on an automobile including an in-vehicle network and an information processing device that is connected to the in-vehicle network and controls a warning to a driver, and
the second electronic device transmits failure information for giving a predetermined warning to the driver to the information processing device via the in-vehicle network in a case where the short-circuit failure is detected.

15. The signal transmission system according to claim 7, wherein
the signal transmission system is mounted on an automobile including an in-vehicle network and a communication port that connects the in-vehicle network to an external failure diagnosis device, and
the second electronic device transmits failure information regarding the short-circuit failure to the failure diagnosis device connected to the communication port via the in-vehicle network in a case where the short-circuit failure is detected.

16. An information provision method using the signal transmission system according to claim 7, the signal transmission system being mounted on an automobile including an in-vehicle network and a communication device that is connected to the in-vehicle network and performs wireless communication, the information provision method comprising:

transmitting, in a case where the second signal processing unit detects the short-circuit failure, failure information regarding the short-circuit failure from the second electronic device to the communication device via the in-vehicle network;
  transmitting the failure information to a server device installed in a location different from a location of the automobile through the wireless communication performed by the communication device;
  acquiring failure target component information regarding the first filter circuit or the second filter circuit in which the short-circuit failure has occurred by using a database registered in advance by the server device;
  making an inquiry, on the basis of the failure target component information, from the server device to a maintenance company that repairs the automobile about whether or not repair is possible;
  transmitting recommended repair information based on a result of the inquiry from the server device; and
  providing information regarding repair of the short-circuit failure to a user of the automobile on the basis of the recommended repair information transmitted from the server device.

17. The information provision method according to claim 16, wherein
  the server device creates statistical information regarding failures of the first filter circuit and the second filter circuit by statistically processing the failure information received from each of a plurality of the automobiles, and
  the statistical information created by the server device is provided to a manufacturer or a seller of the automobile.

* * * * *